US008054298B2

(12) United States Patent
Asano et al.

(10) Patent No.: US 8,054,298 B2
(45) Date of Patent: Nov. 8, 2011

(54) IMAGE DISPLAYING APPARATUS AND IMAGE DISPLAYING METHOD

(75) Inventors: Mitsuru Asano, Kanagawa (JP); Tetsuro Yamamoto, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 439 days.

(21) Appl. No.: 12/382,118

(22) Filed: Mar. 9, 2009

(65) Prior Publication Data

US 2009/0244055 A1 Oct. 1, 2009

(30) Foreign Application Priority Data

Mar. 26, 2008 (JP) ................................ 2008-080097

(51) Int. Cl.
*G11B 7/00* (2006.01)

(52) U.S. Cl. ....................................... 345/173; 345/174

(58) Field of Classification Search .................... 345/39, 345/44-46, 76-84, 204-214, 690-693, 88-94
See application file for complete search history.

(56) References Cited

U.S. PATENT DOCUMENTS 6,201,270 B1 * 3/2001 Chen ............................ 257/292
6,847,171 B2 * 1/2005 Tam .......................... 315/169.3
6,919,868 B2 * 7/2005 Tam ................................ 345/76
7,358,941 B2 * 4/2008 Ono et al. ....................... 345/82
7,443,367 B2 * 10/2008 Numao ........................... 345/76
7,589,699 B2 * 9/2009 Miyazawa ....................... 345/76
7,639,211 B2 * 12/2009 Miyazawa ....................... 345/39
7,696,965 B2 * 4/2010 Cok ............................... 345/82
7,719,492 B2 * 5/2010 Childs ............................ 345/76
7,839,364 B2 * 11/2010 Ahn et al. ....................... 345/76
7,847,796 B2 * 12/2010 Shin et al. ..................... 345/210
2007/0164962 A1 7/2007 Uchino et al.

FOREIGN PATENT DOCUMENTS

JP 2001-195033 A 7/2001
JP 2005-345722 12/2005
JP 2006-133731 A 5/2006
JP 2007-133284 5/2007
JP 2007-310311 A 11/2007
JP 2008-268843 A 11/2008

OTHER PUBLICATIONS

Japanese Office Action issued Mar. 16, 2010 for corresponding Japanese Application No. 2008-080097.

* cited by examiner

*Primary Examiner* — Van Chow
(74) *Attorney, Agent, or Firm* — Rader, Fishman & Grauer PLLC

(57) ABSTRACT

An image displaying apparatus is configured to display a desired image on an image displaying section employed in the image displaying apparatus by making use of a signal-line driving circuit and a scan-line driving circuit to drive pixel circuits. Each of the pixel circuits employs at least a light emitting device, a signal-level holding capacitor, a driving transistor for driving the light emitting device and a signal writing transistor. The signal-line driving circuit and the scan-line driving circuit drive each of the pixel circuits so as to put the light emitting device employed in the pixel circuit in a no-light emission state of emitting no light in a no-light emission period and a light emission state of emitting light in a light emission period repeatedly.

10 Claims, 22 Drawing Sheets

: COMPENSATE
: WRITE

IMAGE DISPLAYING APPARATUS AND IMAGE DISPLAYING METHOD

BACKGROUND OF THE INVENTION

1. Field of the Invention

In general, the present invention relates to an image displaying apparatus as well as an image displaying method adopted by the image displaying apparatus, and can be applied typically to an image displaying apparatus adopting an active matrix driving technique provided for organic EL (Electro Luminescence) devices employed in the image displaying apparatus. In particular, the present invention relates to an image displaying apparatus capable of preventing horizontal-direction cords from being generated on the screen of the image displaying apparatus in order to effectively eliminate deteriorations of the quality of an image being displayed on the screen during simultaneous execution of a process of compensating pixel circuits for variations of threshold voltage of driving transistors employed in the pixel circuits on a plurality of pixel-matrix rows at the same time by swapping a timing to carry out a gradation-voltage setting operation on any specific pixel-matrix row as an operation lagging behind the threshold-voltage variation compensation process, which has been carried out on all pixel-matrix rows at the same time, with a timing to carry out a gradation-voltage setting operation on a pixel-matrix row adjacent to the specific pixel-matrix row as an operation lagging behind the threshold-voltage variation compensation process, and relates to an image displaying method adopted by such an image displaying apparatus in a time-axis direction and/or a scan-line direction.

2. Description of the Related Art

The related image displaying apparatus adopting an active matrix driving technique making use of organic EL (Electro Luminescence) devices is provided with an image displaying section created by arranging pixel matrixes, which each have an organic EL device and a transistor for driving the organic EL device, to form a pixel matrix. In addition, the related image displaying apparatus also includes a signal-line driving circuit and a scan-line driving circuit, which are provided at locations surrounding the image displaying section, to serve as circuits for driving the pixel circuits in order to display a desired image on the image displaying section.

With regard to the image displaying apparatus making use of organic EL (Electro Luminescence) devices, Japanese Patent Laid-open No. 2005-345722 proposes a method for assuring a high quality of the image even if a driving transistor of the N-channel type is employed to serve as a transistor for driving an organic EL device in every pixel circuit. The method is capable of assuring a high quality of the image by compensating a pixel circuit for variations of the threshold voltage of the driving transistor in the pixel circuit from transistor to transistor in a process of setting a gradation in the pixel circuit in order to get rid of luminance variations caused by the variations of the threshold voltage to appear as variations of the luminance of light emitted by the organic EL device employed in the same pixel circuit from pixel to pixel.

In addition, Japanese Patent Laid-open No. 2007-133284 discloses a configuration in which processing to compensate a pixel circuit for variations of the threshold voltage of the driving transistor employed in the pixel circuit is carried out a plurality of times by dividing the processing into a plurality of processes each executed in a period.

A drain-source current Ids flowing through every driving transistor employed in the image displaying apparatus of the type described above to serve as a transistor for driving the organic EL device serving as an LED (light emitting device) in the image displaying apparatus can be expressed by equations given as follows:

$$Ids=\beta/2\cdot(Vgs-Vth)$$

$$\beta=\mu\cdot W/L\cdot \mathrm{Cox} \quad (1)$$

In the above equation, reference notation Vgs denotes a voltage applied between the gate and source electrodes of the driving transistor, reference notation μ denotes the mobility of the driving transistor, reference notation W denotes the channel width of the driving transistor, reference notation L denotes the channel length of the driving transistor, reference notation Cox denotes the capacity per unit area of the gate insulating film of the driving transistor and reference notation Vth denotes the threshold voltage of the driving transistor.

Thus, in an operation to drive the organic EL device in accordance with the drain-source current Ids of the driving transistor by setting the gate-source voltage Vgs of the transistor, even for the same set magnitude of the gate-source voltage Vgs, the drain-source current Ids varies from transistor to transistor due to an effect given by variations in threshold voltage Vth from transistor to transistor. As a result, the luminance of light emitted by the organic EL device also varies from pixel to pixel as well.

Reference notations Iref and Vref are substituted into Equation (1) given above to serve as replacements for reference notations Ids and Vgs respectively and, then, an equation obtained as a result of the substitution is rewritten into Equation (2) given as follows.

$$V\mathrm{ref}=(I\mathrm{ref}/(\beta/2))^{1/2}+Vth \quad (2)$$

Let a voltage difference of (Vdata−Vref) be a difference in voltage between a voltage Vdata representing the luminance of light emitted by the organic EL device and the voltage Vref expressed by Equation (2). Next, the voltage difference of (Vref−Vdata) is substituted into Equation (1) to serve as a replacement for reference notation Vgs and, then, the right-hand expression of Equation (2) is substituted into an equation obtained as a result of the substitution of the voltage difference of (Vref Vdata)to serve as a replacement for reference notation Vref to result in Equation (3) given as follows:

$$Ids=\beta/2\cdot(V\mathrm{data}-(I\mathrm{ref}/\beta/2))^{1/2})^2 \quad (3)$$

It is obvious that Equation (3) no longer includes the term of the threshold voltage Vth, implying that the drain-source current Ids does not vary from transistor to transistor due to variations in threshold voltage Vth and, hence, the luminance of light emitted by the organic EL device can be prevented from varying from pixel to pixel due to variations in drain-source current Ids. Thus, by applying a bias determined by the voltage Vref to the gate-source voltage Vgs of the driving transistor and a bias determined by the current Iref to the drain-source current Ids flowing through the driving transistor, it is possible to get rid of luminance variations caused by the variations of the threshold voltage Vth of the driving transistor to appear as variations of the luminance of light emitted by the organic EL device employed in the same pixel circuit as the driving transistor from pixel to pixel. It is to be noted that each of the voltage Vref and the current Iref, which are used in Equation (2), has a constant magnitude determined by the characteristic of the driving transistor which drives the organic EL device employed in the same pixel circuit as the driving transistor.

If the current Iref is set at 0 (that is, Iref=0), from Equation (2), the voltage Vref becomes equal to Vth (that is, Vref=Vth).

With Iref set at 0, Equation (3) is simplified into the following equation:

$$Ids=\beta/2\cdot(V\text{data})^2$$

Also in this case, it is obvious that the above equation no longer includes the term of the threshold voltage Vth, implying that the drain-source current Ids does not vary from transistor to transistor due to variations in threshold voltage Vth and, hence, the luminance of light emitted by the organic EL device can be prevented from varying from pixel to pixel due to variations in drain-source current Ids. That is to say, with the current Iref set at 0, by merely applying a bias Vref to the gate-source voltage Vgs of the driving transistor as indicated by the above equation, the pixel circuit can be compensated for luminance variations caused by the variations of the threshold voltage Vth of the driving transistor to appear as variations of the luminance of light emitted by the organic EL device employed in the same pixel circuit as the driving transistor from pixel to pixel. Each of Japanese Patent Laid-open No. 2005-345722 and Japanese Patent Laid-open No. 2005-133284, which are mentioned before, discloses a method based on this principle as a method for compensating the pixel circuit for luminance variations caused by the variations of the threshold voltage Vth of the driving transistor to appear as variations of the luminance of light emitted by the organic EL device employed in the same pixel circuit as the driving transistor from pixel to pixel.

FIG. 17 is a block diagram showing interconnections of sections employed in an image displaying apparatus 1 disclosed in Japanese Patent Laid-open No. 2007-133284. As shown in the block diagram, the image displaying apparatus 1 also employs a signal-line driving circuit 3 which includes a horizontal selector (HSEL) 2. In addition, the image displaying apparatus 1 employs a scan-line driving circuit 5 which includes a write scanner (WSCN) 4A and a drive scanner (DSCN) 4B.

The horizontal selector 2 employs a plurality of latch circuits for sequentially latching input image data D1. Each of the latch circuits is provided for one of signal lines SIG connected to the image displaying section 6. The input image data D1 latched in the latch circuits is apportioned to the signal lines SIG. The input image data D1 to be apportioned to any one of the signal lines SIG is converted into an analog signal in a digital-to-analog conversion process and asserted to the signal line SIG to serve as one of signal-line driving signals Ssig which sequentially show gradations of pixel circuits connected to the signal lines SIG. The horizontal selector 2 outputs the signal-line driving signal Ssig to a signal line SIG for which the signal-line driving signal Ssig is generated.

Each of the write scanner 4A and the drive scanner 4B sequentially transfers a reference signal generated by a signal generation circuit not shown in the block diagram of FIG. 17 to scan lines to serve as a write scan-line driving signal WS and a drive scan-line driving signal DS respectively. To be more specific, the write scanner 4A asserts the write scan-line driving signal WS on a write scan line connected to the gate electrode of each signal writing transistor TR5 on a row corresponding to the write scan line whereas the drive scanner 4B asserts the drive scan-line driving signal DS on a drive scan line connected to the gate electrode of each power switching transistor TR2 on a row corresponding to the drive scan line.

The image displaying section 6 includes predetermined pixel circuits 7 which are arranged to form a pixel matrix. Each of the pixel circuits 7 has an NMOS transistor TR1 for driving an organic EL device 8 which serves as an LED (Light Emitting Device) driven by a drain-source current Ids generated by the NMOS transistor TR1. In the following description, the NMOS transistor TR1 is also referred to as a driving transistor TR1. The gate and source electrodes of the driving transistor TR1 functioning as a source follower are connected respectively to the two terminals of a signal-level holding capacitor C1. In the block diagram of FIG. 17, reference notation Cp denotes a capacitive component of the organic EL device 8 whereas reference notation Vss1 denotes a cathode voltage which is a voltage applied to the cathode electrode of the organic EL device 8.

The drive scan-line driving signal DS generated by the drive scanner 4B is applied to the gate of an NMOS transistor TR2 also referred to hereinafter as a power switching transistor in order to put the power switching transistor TR2 in a state of being turned on or off in accordance with the drive scan-line driving signal DS. The drain electrode of the power switching transistor TR2 is connected to a driving power supply for supplying a power-supply voltage Vdd. In the pixel circuit 7, with the power switching transistor TR2 controlled to enter a state of being turned on by the drive scan-line driving signal DS, the power supply generating the power-supply voltage Vdd supplies a current to the driving transistor TR1 by way of the power switching transistor TR2 and the driving transistor TR1 may forward the current to the organic EL device 8 as the drain-source current Ids mentioned above. With the power switching transistor TR2 controlled to enter a state of being turned off by the drive scan-line driving signal DS, on the other hand, the current supplied to the driving transistor TR1 by way of the power switching transistor TR2 is cut off so that the drain-source current Ids flowing to the organic EL device 8 is also cut off as well. In this way, the organic EL device 8 can be controlled to enter a state of emitting light or emitting no light in accordance with whether or not the drain-source current Ids is flowing to the organic EL device 8.

The write scan-line driving signal WS generated by the write scanner 4A is applied to the gate of an NMOS transistor TR5 also referred to hereinafter as a signal writing transistor in order to put the signal writing transistor TR5 in a state of being turned on or off in accordance with the drive scan-line driving signal DS. The gate electrode of the driving transistor TR1 is connected to a specific one of the terminals of the signal-level holding capacitor C1 as described above and also wired to the signal line SIG, which is connected to the horizontal selector 2, through the signal writing transistor TR5. Thus, the pixel circuit 7 is provided with a configuration in which, with the signal writing transistor TR5 controlled to enter a state of being turned on by the write scan-line driving signal WS, the signal-line driving signal Ssig asserted on the signal line SIG is applied to the specific terminal of the signal-level holding capacitor C1 and the gate electrode of the driving transistor TR1 by way of the signal writing transistor TR5 as a desired voltage. In this patent specification, the specific terminal of the signal-level holding capacitor C1 is a terminal connected to the gate electrode of the driving transistor TR1 and the signal writing transistor TR5 whereas the other terminal of the signal-level holding capacitor C1 is a terminal connected to the source electrode of the driving transistor TR1 and the anode electrode of the organic EL device 8.

As described above, in the pixel circuit 7, with the power switching transistor TR2 controlled to enter a state of being turned off by the drive scan-line driving signal DS, the current supplied to the driving transistor TR1 by way of the power switching transistor TR2 is cut off so that the drain-source current Ids flowing to the organic EL device 8 is also cut off as well. In this state, the pixel circuit 7 starts a no-light emission period. With the signal writing transistor TR5 controlled to enter a state of being turned on by the write scan-line driving signal WS, a high-level signal-line driving signal Ssig asserted on the signal line SIG is applied to the specific terminal of the signal-level holding capacitor C1 and the gate electrode of the driving transistor TR1 by way of the signal writing transistor TR5 so that a voltage appearing on the specific terminal of the signal-level holding capacitor C1 and the gate electrode of the driving transistor TR1 once rises. With the voltage on the specific terminal of the signal-level holding capacitor C1 and the gate electrode of the driving transistor TR1 rising, a voltage appearing on the other terminal of the signal-level holding capacitor C1, the source electrode of the driving transistor TR1 and the anode electrode of the organic EL device 8, which are connected to each other, also once rises as well. Since the electric charge accumulated on the other terminal of the signal-level holding capacitor C1 is discharged through the organic EL device 8, however, the voltage appearing on the other terminal of the signal-level holding capacitor C1, the source electrode of the driving transistor TR1 and the anode electrode of the organic EL device 8 is sustained at the threshold voltage of the organic EL device 8.

Then, in the pixel circuit 7, when the level of the signal-line driving signal Ssig asserted on the signal line SIG becomes lower, the voltage appearing on the specific terminal of the signal-level holding capacitor C1 and the gate electrode of the driving transistor TR1 also becomes lower as well. In addition, due to a coupling effect exhibited by the signal-level holding capacitor C1, the voltage appearing on the other terminal of the signal-level holding capacitor C1, the source electrode of the driving transistor TR1 and the anode electrode of the organic EL device 8 also becomes lower to a level not higher than the threshold voltage of the organic EL device 8 in a manner of being interlocked with the phenomenon showing that the voltage appearing on the specific terminal of the signal-level holding capacitor C1 and the gate electrode of the driving transistor TR1 is becoming lower.

With the level of the signal-line driving signal Ssig on the signal line SIG becoming high and low as described above, in the pixel circuit 7, a voltage applied between the two terminals of the signal-level holding capacitor C1 is set at a magnitude at least equal to the threshold voltage Vth of the driving transistor TR1 and a compensation preparing process preparing for a process of compensating a pixel circuit 7 for variations of the threshold voltage Vth of the driving transistor TR1 in the pixel circuit 7 from transistor to transistor is completed. In this patent specification, the process of compensating a pixel circuit for variations of the threshold voltage Vth of the driving transistor TR1 in the pixel circuit from transistor to transistor is referred to as a threshold-voltage variation compensation process which is below. In addition, in this patent specification, unless otherwise specified, the threshold-voltage variation compensation process is carried out right after the compensation preparing process.

Then, in the pixel circuit 7, the power switching transistor TR2 is controlled to enter a state of being turned on by the drive scan-line driving signal DS in order to start an operation to supply a current from the power supply for generating the power-supply voltage Vdd to the driving transistor TR1 by way of the power switching transistor TR2. With such an operation started, driven by the gate-source voltage Vgs of the driving transistor TR1, that is, driven by the voltage applied between the two terminals of the signal-level holding capacitor C1, the driving transistor TR1 gradually charges the other terminal of the signal-level holding capacitor C1 (that is, the terminal connected to the source electrode of the driving transistor TR1 and the anode electrode of the organic EL device 8) so that the voltage applied between the two terminals of the signal-level holding capacitor C1 gradually decreases. As the voltage applied between the two terminals of the signal-level holding capacitor C1 decreases to a magnitude equal to the threshold voltage Vth of the driving transistor TR1, the driving transistor TR1 stops the electrical charging operation. In this way, the pixel circuit 7 sets the voltage applied between the two terminals of the signal-level holding capacitor C1 at the threshold voltage Vth of the driving transistor TR1 in the aforementioned process of compensating a pixel circuit 7 for variations of the threshold voltage Vth of the driving transistor TR1 in the pixel circuit 7 from transistor to transistor.

The pixel circuit 7 operates over a plurality of periods in each of which the driving transistor TR1 gradually charges the other terminal of the signal-level holding capacitor C1 (that is, the terminal connected to the source electrode of the driving transistor TR1 and the anode electrode of the organic EL device 8) so that the voltage applied between the two terminals of the signal-level holding capacitor C1 is eventually set at a magnitude equal to the threshold voltage Vth of the driving transistor TR1 as described above. Each consecutive two of such charging periods to eventually set the voltage applied between the two terminals of the signal-level holding capacitor C1 at a magnitude equal to the threshold voltage Vth of the driving transistor TR1 sandwich a pause period determined in advance. If sufficient charging time can be allocated to the charging processes in one horizontal scan period, the series of charging process of eventually setting the voltage applied between the two terminals of the signal-level holding capacitor C1 at a magnitude equal to the threshold voltage Vth can be carried out after the compensation preparing process mentioned earlier in one horizontal scan period.

Then, in the pixel circuit 7, a gradation voltage indicating the luminance of light emitted by the organic EL device 8 is set on the gate electrode of the driving transistor TR1 via the signal writing transistor TR5. At that point, the gradation voltage is corrected in accordance with the threshold voltage Vth of the driving transistor TR1 and the corrected gradation voltage is newly set as a voltage applied between the two terminals of the signal-level holding capacitor C1 to replace the threshold voltage Vth which has been set so far as a voltage applied between the two terminals of the signal-level holding capacitor C1. In this patent specification, a process to set a gradation voltage indicating the luminance of light emitted by the organic EL device 8 on the gate electrode of the driving transistor TR1 by way of the signal writing transistor TR5 is referred to as a gradation-voltage setting operation.

In the pixel circuit 7, with the signal line SIG put in a state of being electrically connected to the gate electrode of the driving transistor TR1 by the signal writing transistor TR5 put in a state of being turned on, after the power supply for generating the power-supply voltage Vdd has output a current to the driving transistor TR1 by way of the power switching transistor TR2 put in a state of being turned on for a fixed period of time, the signal writing transistor TR5 is put in a state of being turned off and a light emission period is commenced while the gradation-voltage setting operation is ended.

In accordance with a configuration disclosed in Japanese Patent Laid-open No. 2007-133284, by carrying out the processing to compensate a pixel circuit for variations of the threshold voltage Vth of the driving transistor TR1 in the pixel circuit from transistor to transistor in a plurality of periods, every two of which sandwich the pause period mentioned before, the resolution of the image can be improved so that, even if sufficient time cannot be allocated to the processing to compensate a pixel circuit for variations of the threshold voltage Vth of the driving transistor TR1 in the pixel circuit from transistor to transistor in one horizontal scan period, sufficient time can be allocated to the compensation processing in a plurality of horizontal scan periods, in which the compensation processing is to be carried out, in order to allow the execution of the processing to compensate the pixel circuit for variations of the threshold voltage Vth of the driving transistor TR1 in the pixel circuit from transistor to transistor.

With the signal line SIG put in a state of being electrically connected to the gate electrode of the driving transistor TR1 by the signal writing transistor TR5 put in a state of being turned on, after the power supply for generating the power-supply voltage Vdd has output a current to the driving transistor TR1 by way of the power switching transistor TR2 put in a state of being turned on for a fixed period of time, the signal writing transistor TR5 is put in a state of being turned off. At the time the signal writing transistor TR5 is put in a state of being turned off, the larger the mobility of the driving transistor TR1 employed in a pixel circuit 7, the more the voltage applied between the two terminals of the signal-level holding capacitor C1 employed in the same pixel circuit 7 as the driving transistor TR1 can be reduced. Thus, it is possible to decrease luminance variations caused by the variations of the mobility of the driving transistor TR1 to appear as variations of the luminance of light emitted by the organic EL device employed in the same pixel circuit 7 as the driving transistor TR1 from pixel to pixel. In this patent specification, a process of decreasing luminance variations caused by the variations of the mobility of the driving transistor TR1 to appear as variations of the luminance of light emitted by the organic EL device employed in the same pixel circuit as the driving transistor TR1 from pixel to pixel is referred to as a mobility variation compensation process which is carried out while the gradation-voltage setting operation is being performed.

However, the configuration shown in the block diagram of FIG. 17 has a shortcoming that each pixel circuit 7 employs three NMOS transistors TR1, TR2 and TR5 which make the configuration complicated. As one of possible methods for overcoming this shortcoming, the power switching transistor TR2 for controlling the power supply serving as the source of the drain-source current Ids is eliminated. In this case, the power supply for supplying the drain-source current Ids to the driving transistor TR1 is controlled by the drive scanner 4B employed in the scan-line driving circuit 5.

FIG. 18 is a block diagram showing interconnections of sections employed in an image displaying apparatus 11 not employing the power switching transistor TR2. In the configuration shown in the block diagram of FIG. 18, each of configuration components identical with their respective counterparts employed in the image displaying apparatus 1 shown in the block diagram of FIG. 17 is denoted by the same reference numeral or notation as the counterpart. In addition, each of configuration components identical with their respective counterparts employed in the image displaying apparatus 1 shown in the block diagram of FIG. 17 is not explained in order to avoid duplications of descriptions. The image displaying apparatus 11 has an image displaying section 12 created on an insulating substrate determined in advance. In addition, the image displaying apparatus 11 also includes a signal-line driving circuit 13 and a scan-line driving circuit 14, which are provided at locations surrounding the image displaying section 12. The signal-line driving circuit 13 includes a horizontal selector (HSEL) 15 whereas the scan-line driving circuit 14 which includes a write scanner (WSCN) 16A and a drive scanner (DSCN) 16B.

Much like the horizontal selector 2 employed in the image displaying apparatus 1 shown in the block diagram of FIG. 17, the horizontal selector 15 employs a plurality of latch circuits for sequentially latching input image data D1. Each of the latch circuits is provided for one of signal lines SIG connected to the image displaying section 12. The input image data D1 latched in the latch circuits is apportioned to the signal lines SIG. The input image data D1 to be apportioned to any one of the signal lines SIG is converted into an analog signal in a digital-to-analog conversion process and asserted to the signal line SIG to serve as one of driving signals Vsig which sequentially show gradations of pixel circuits connected to the signal lines SIG. The horizontal selector 15 also outputs a predetermined reference voltage Vofs determined in advance alternately to the analog signals Vsig obtained as a result of the digital-to-analog conversion process. The horizontal selector 15 outputs a signal-line driving signal Ssig including the predetermined reference voltage Vofs and the gradation voltage Vsig to a signal line SIG for which the signal-line driving signal Ssig is generated.

Each of the write scanner 16A and the drive scanner 16B sequentially transfers a reference signal generated by a signal generation circuit not shown in the block diagram of FIG. 18 to scan lines to serve as a write scan-line driving signal WS and a drive scan-line driving signal DS respectively. To be more specific, the write scanner 16A asserts the write scan-line driving signal WS on a write scan line connected to the gate electrode of each transistor TR5 on a row corresponding to the write scan line whereas the drive scanner 16B asserts the drive scan-line driving signal DS on a drive scan line connected to the drain electrode of each transistor TR1 on a row corresponding to the drive scan line.

The image displaying section 12 includes pixel circuits 17 which are arranged to form a pixel matrix. The pixel circuit 17 has a configuration identical with the configuration of the pixel circuit 7 employed in the image displaying apparatus 1 shown in the block diagram of FIG. 17 except that the pixel circuit 17 does not employ the power switching transistor TR2 for controlling the Vdd generating power supply for outputting a current to the driving transistor TR1.

FIGS. 19A1 to 19F2 are timing charts referred to in explanation of operations carried out by the pixel circuit 17. It is to be noted that, in the following description, in order to make the explanation simple, it is assumed that the capacitance of a parasitic capacitor of the gate electrode of the driving transistor TR1 is sufficiently small in comparison with the capacitance of the signal-level holding capacitor C1 but the capacitance of the capacitive component Cp of the organic EL device 8 is sufficiently large in comparison with the capacitance of the signal-level holding capacitor C1. In addition, the image displaying apparatus 11 carries out the gradation-voltage setting operation to set the luminance of light emitted by each of pixel circuits 17 sequentially on a row-after-row basis, that is, one gradation-voltage setting operation carried out at one time on one pixel-matrix row, for every field. In FIGS. 19A1 to 19F2, reference notation i denotes a number assigned to a specific pixel-matrix row subjected to the process of setting the luminance of light emitted by a pixel circuit 17 on the specific pixel-matrix row and reference notation (i+1) denotes a number assigned to a next pixel-matrix row following the specific pixel-matrix row to serve as a next pixel-matrix row subjected next to the process of setting the luminance of light emitted by a pixel circuit 17 on the next pixel-matrix row. Each of the numbers i and (i+1) is also used as a subscript assigned to a signal appearing on a signal line SIG, a write scan line and a drive scan line, which pertain to the pixel-matrix row, assigned to a signal appearing to the gate or source electrode of the driving transistor TR1 on the pixel-matrix row or assigned to the pixel circuit 17 employing the organic EL device 8 on the pixel-matrix row. In addition, in FIGS. 19A1 to 19F2, the word "Preparation" is used to denote the period of a compensation preparing process of preparing for a process of compensating the pixel circuit for variations of the threshold voltage Vth of the driving transistor TR1 in the pixel circuit from transistor to transistor. As described before, in the compensation preparing process, the voltage appearing between the two terminals of the signal-level holding capacitor C1 is set at a magnitude at least equal to the threshold voltage Vth of the driving transistor TR1 employed in the same pixel circuit 17 as the signal-level holding capacitor C1. Then, after the compensation preparing process has been completed, a threshold-voltage variation compensation process of changing the voltage appearing between the two terminals of the signal-level holding capacitor C1 from the magnitude set in the compensation preparing process as the magnitude at least equal to the threshold voltage Vth of the driving transistor TR1 to a magnitude equal to the threshold voltage Vth of the driving transistor TR1 employed in the same pixel circuit 17 as the signal-level holding capacitor C1 is carried out once in one period of time. In FIGS. 19A1 to 19F2, the time period of this threshold-voltage variation compensation process is denoted by the phrase "Vth compensation." After the threshold-voltage variation compensation process has been completed, a mobility variation compensation process is carried out to compensate the pixel circuit 17 for variations of the mobility μ of the driving transistor TR1 in the pixel circuit 17 from transistor to transistor. In FIGS. 19A1 to 19F2, the time period of this mobility variation compensation process is denoted by the phrase "μ compensation."

As shown in FIGS. 19A1 to 19F2, at a time t1, each pixel circuit 17 starts a no-light emission period T1 during which the light emission of the organic EL device 8 is stopped. At the time t1, the voltage of the drive scan-line driving signal DS drops from a power-supply voltage Vdd at which the drive scan-line driving signal DS is set during a light emission period T2 to another reference voltage Vss2 as depicted by a timing chart of FIG. 19B1 for the ith pixel-matrix row. By the way, a timing chart of FIG. 19B2 is the timing chart of the drive scan-line driving signal DS on the (i+1)th pixel-matrix row. As a matter of fact, in the following description, a prefix "1" appended to a reference notation to form a reference notation such as FIG. 19B1 indicates that the timing chart is the timing chart of a signal or a pixel circuit 17 including an organic EL device 8 on the ith pixel-matrix row. On the other hand, a prefix "2" appended to a reference notation to form a reference notation such as FIG. 19B2 indicates that the timing chart is the timing chart of a signal or a pixel circuit 17 including an organic EL device 8 on the (i+1)th pixel-matrix row. The other reference voltage Vss2 is a voltage lower than the sum of a cathode voltage Vss1 of the organic EL device 8 and the threshold voltage of the organic EL device 8. Thus, in the pixel circuit 17, the electrode of the driving transistor TR1 receiving the drive scan-line driving signal DS functions as the source electrode and the voltage appearing on the anode electrode of the organic EL device 8 becomes lower, ending the light emission of the organic EL device 8. In addition, electric charge accumulated in the signal-level holding capacitor C1 is discharged from the other terminal of the signal-level holding capacitor C1 through the driving transistor TR1. Thus, the other terminal of the signal-level holding capacitor C1 is set at the other reference voltage Vss2 as depicted by timing charts of FIGS. 19E1 and 19E2. As described earlier, the other terminal of the signal-level holding capacitor C1 is the terminal connected to the anode electrode of the organic EL device 8. Each of the timing charts of FIGS. 19E1 and 19E2 is shown as the timing chart of a source signal Vs appearing on the source electrode of the driving transistor TR1.

In addition, at a time in the period of a compensation preparing process, in the pixel circuit 17, the signal-line driving signal Ssig asserted on the signal line SIG is lowered to the predetermined reference voltage Vofs as depicted by a timing chart of FIG. 19C and, then, the write scan-line driving signal WS is raised in order to put the signal writing transistor TR5 in a state of being turned on as depicted by timing charts of FIGS. 19A1 and 19A2. Thus, the gate voltage Vg of the driving transistor TR1 in the pixel circuit 17 is set at the predetermined reference voltage Vofs appearing on the signal line SIG as depicted by timing charts of FIGS. 19D1 and 19D2 and the voltage appearing between the two terminals of the signal-level holding capacitor C1 is set at (Vofs−Vss2). In the pixel circuit 17, the predetermined reference voltage Vofs and the other reference voltage Vss2 are set at such levels that the voltage (Vofs−Vss2) appearing between the two terminals of the signal-level holding capacitor C1 is greater than the threshold voltage Vth of the driving transistor TR1, that is, the relation (Vss2<(Vofs−Vth)) is satisfied.

Thus, in the pixel circuit 17, the voltage appearing between the two terminals of the signal-level holding capacitor C1 is set at (Vofs−Vss2) which is a voltage greater than the threshold voltage Vth of the driving transistor TR1 in a compensation preparing process of preparing for a threshold-voltage (Vth) variation compensation process of setting the voltage appearing between the two terminals of the signal-level holding capacitor C1 at the threshold voltage Vth of the driving transistor TR1 as depicted by timing charts of FIGS. 19F1 and 19F2. It is to be noted that, in consequence, the predetermined reference voltage Vofs needs to be a voltage that does not put the driving transistor TR1 in a state of being turned on after the execution of the threshold-voltage variation compensation process of compensating a pixel circuit for variations of the threshold voltage Vth of the driving transistor TR1 in the pixel circuit from transistor to transistor. That is to say, the relation (Vofs<Vss1+Vtholed+Vth) needs to be satisfied where reference notation Vthoeld denotes the threshold voltage of the organic EL device 8.

Then, at a time t2 in a period of sustaining the signal-line driving signal Ssig appearing on the signal line SIG at the predetermined reference voltage Vofs, with the signal writing transistor TR5 in the pixel circuit 17 sustained in a state of being turned on as it is, the drive scan-line driving signal DS is raised to the power-supply voltage Vdd provided for the light emission period in order to start an operation to supply a drain-source current Ids to the driving transistor TR1 as depicted by timing charts of FIGS. 19B1 and 19B2. Subsequently, at a point of time immediately before the level of the signal-line driving signal Ssig appearing on the signal line SIG is set at the gradation voltage Vsig, the write scan-line driving signal WS is lowered in order to put the driving transistor TR1 in a state of being turned off.

With the pixel circuit 17 put in this state, a charging current is flowing from the power supply for generating the power-supply voltage Vdd to the other terminal of the signal-level holding capacitor C1 by way of the driving transistor TR1 on the condition that the voltage appearing between the two terminals of the signal-level holding capacitor C1 is greater than the threshold voltage Vth of the driving transistor TR1 so that the source voltage Vs of the driving transistor TR1 is gradually increasing to such a level that the voltage appearing between the two terminals of the signal-level holding capacitor C1 becomes equal to the threshold voltage Vth of the driving transistor TR1 as depicted by timing charts of FIGS. 19E1 and 19E2. As described before, the other terminal of the signal-level holding capacitor C1 is the terminal connected to the anode electrode of the organic EL device 8. In the timing diagram of FIGS. 19A1 to 19F2, the voltage appearing between the two terminals of the signal-level holding capacitor C1 is the difference between the gate voltage Vg shown in a timing chart of FIG. 19D1 or 19D2 and the source voltage Vs shown in the timing chart of FIG. 19E1 or 19E2. That is to say, in the pixel circuit 17, the voltage appearing between the two terminals of the signal-level holding capacitor C1 is gradually approaching the threshold voltage Vth of the driving transistor TR1. As the voltage appearing between the two terminals of the signal-level holding capacitor C1 becomes equal to the threshold voltage Vth of the driving transistor TR1, the source voltage Vs of the driving transistor TR1 stops rising. In this way, the voltage appearing between the two terminals of the signal-level holding capacitor C1 is set at the threshold voltage Vth of the driving transistor TR1 in the pixel circuit 17 in an operation referred to as the so-called threshold-voltage variation compensation process.

Then, in the pixel circuit 17, at a time t3, the level of the signal-line driving signal Ssig appearing on the signal line SIG is set at the gradation voltage Vsig generated for the pixel circuit 17. At the same time, the write scan-line driving signal WS is raised to a high level in order to put the signal writing transistor TR5 in a state of being turned on as depicted by timing charts of FIGS. 19A1 and 19A2. With the signal writing transistor TR5 put in a state of being turned on, the gate electrode of the driving transistor TR1 is electrically connected to the signal line SIG. At a point of time upon the lapse of a period Tμ determined in advance, the write scan-line driving signal WS is decreased to a low level in order to electrically disconnect the gate electrode of the driving transistor TR1 from the signal line SIG. In this state, the gradation voltage Vsig which has been appearing as the signal-line driving signal Ssig on the signal line SIG is held in the specific terminal of the signal-level holding capacitor C1. As described previously, the specific terminal of the signal-level holding capacitor C1 is the terminal connected to the gate electrode of the driving transistor TR1. Since the voltage appearing between the two terminals of the signal-level holding capacitor Cl has been set at the threshold voltage Vth of the driving transistor TR1 employed in the pixel circuit 17, the threshold voltage Vth set between the two terminals of the signal-level holding capacitor C1 is used for compensating the pixel circuit 17 for variations of the threshold voltage Vth of the driving transistor TR1 in the pixel circuit 17 from transistor to transistor in setting the voltage appearing between the two terminals of the signal-level holding capacitor C1 at a voltage according to the gradation voltage Vsig. Thus, the image displaying apparatus 11 is capable of getting rid of image-quality deteriorations caused by the variations of the threshold voltage Vth of the driving transistor TR1 from transistor to transistor.

With the gate electrode of the driving transistor TR1 put in a state of being electrically connected to the signal line SIG during the period Tμ cited above, the power-supply voltage Vdd is applied to the driving transistor TR1. Thus, the source voltage Vs of the driving transistor TR1 is gradually rising in accordance with the magnitude of the drain-source current Ids which depends on the gate-source voltage Vgs of the driving transistor TR1 as shown in Equation (1). In addition, the speed at which the source voltage Vs of the driving transistor TR1 is rising is also determined by the mobility μ of the driving transistor TR1 as is obvious from the equation. To be more specific, the larger the mobility μ of the driving transistor TR1, the higher the speed at which the source voltage Vs of the driving transistor TR1 is rising. As the source voltage Vs rises, however, the gate-source voltage Vgs decreases, making it difficult for the drain-source current Ids to flow through the driving transistor TR1.

Thus, in the pixel circuit 17, there is observed a phenomenon in which the larger the mobility μ of the driving transistor TR1, the larger the decrease made during the period Tμ as a decrease of the voltage appearing between the two terminals of the signal-level holding capacitor C1. This phenomenon occurs in the so-called mobility compensation process of compensating the pixel circuit 17 for variations of mobility μ of the driving transistor TR1 in the pixel circuit 17 from transistor to transistor in order to prevent the quality of the image from deteriorating. It is to be noted that the drain-source current Ids flowing through the driving transistor TR1 during the period Tμ is expressed by Equation (4) as follows:

$$Ids=\beta/2\cdot(1/V\mathrm{sig}+\beta/2\cdot T\mu/C)^{-2}$$

$$C=C1+\mathrm{Coled} \quad (4)$$

In the above equation, reference notation C1 denotes the capacitance of the signal-level holding capacitor C1 whereas reference notation Coled denotes the capacitance of the capacitive component Cp of the organic EL device 8.

Thus, the period prior to the time t2 is the period of the compensation preparing process of setting the voltage appearing between the two terminals of the signal-level holding capacitor C1 at a magnitude at least equal to the threshold voltage Vth of the driving transistor TR1. The period between the time t2 and a point of time immediately leading ahead of the time t3 is the period of a threshold-voltage (Vth) variation compensation process of setting the voltage appearing between the two terminals of the signal-level holding capacitor C1 at a magnitude equal to the threshold voltage Vth of the driving transistor TR1. The period between the times t3 and t4 is the period of the gradation-voltage setting operation to store the voltage of a gradation voltage Vsig in the signal-level holding capacitor C1 and the mobility variation compensation process of reducing the voltage appearing between the two terminals of the signal-level holding capacitor C1 to a level dependent on the mobility μ of the driving transistor TR1.

In the pixel circuit 17, the write scan-line driving signal WS is decreased to a low level at a time t4 in order to put the signal writing transistor TR5 in a state of being turned off so that the gate electrode of the driving transistor TR1 is put in a state of being electrically disconnected from the signal line SIG, that is a state of being floated. At this point of time, a light emission period T2 is commenced. In this light emission period T2, the organic EL device 8 is driven to emit light by the drain-source current Ids which is flowing through the driving transistor TR1 in accordance with the voltage appearing between the two terminals of the signal-level holding capacitor C1 to serve as the gate-source voltage Vgs of the driving transistor TR1. It is to be noted that, during this light emission period T2, the drain-source current Ids is accumulating electric charge in the capacitive component Cp of the organic EL device 8, raising the source voltage Vs of the driving transistor TR1 from a level attained at the end of the period Tμ and, due to an operation caused by the coupling effect of the signal-level holding capacitor C1 to appear as a bootstrap operation of the signal-level holding capacitor C1, the gate voltage Vg also rises as well from a level attained at the end of the period Tμ. As a result, the organic EL device 8 starts to emit light. In the course of time, the gate voltage Vg and source voltage Vs of the driving transistor TR1 stop rising and each stay at a fixed level. It is to be noted that, in order to operate the driving transistor TR1 in a saturated region during the light emission period T2, the power-supply voltage Vdd needs to be set at such a level that the relation (Vdd>Vthoeld+Vgs−Vth) given before is satisfied.

Thus, in the typical configuration of the image displaying apparatus 11 shown in the block diagram of FIG. 18, as shown in FIGS. 20A to 20E, reference notation 1H denotes a horizontal scan period during which the compensation preparing process, the threshold-voltage variation compensation process, the mobility variation compensation process and the gradation-voltage setting operation, which have been described above, are carried out on each of pixel circuits 17 on consecutive pixel-matrix rows. The compensation preparing process, the threshold-voltage variation compensation process, the mobility variation compensation process and the gradation-voltage setting operation are carried out on pixel circuits 17 of the ith pixel-matrix row, pixel circuits 17(i+1) of the (i+1)th pixel-matrix row, pixel circuits 17(i+2) of the (i+2)th pixel-matrix row, pixel circuits 17(i+3) of the (i+3)th pixel-matrix row and so on sequentially on a row-after-row basis, that is, one gradation-voltage setting operation carried out at one time on one pixel-matrix row, in order to set gradations in the pixel circuits 17, the pixel circuits 17(i+1), the pixel circuits 17(i+2), the pixel circuits 17(i+3) and so on so as to display a desired image on the image displaying section 12. It is to be noted that, in FIGS. 20A to 20E, reference notation "Compensate" denotes the compensation preparing process and the threshold-voltage variation compensation process whereas reference notation "Write" denotes the gradation-voltage setting operation which includes the mobility variation compensation process as described above by referring to FIGS. 19A1 to 19F2. As described above by referring to FIGS. 19A1 to 19F2, the gradation-voltage setting operation is an operation to hold the gradation voltage Vsig appearing on the signal line SIG as the signal-line driving signal Ssig in the signal-level holding capacitor C1.

Japanese Patent Laid-open No. 2002-514320, Japanese Patent Laid-open No. 2004-133240 and Japanese Patent Laid-open No. 2004-246204 propose a method for compensating a pixel circuit for variations of the threshold voltage of the driving transistor in the pixel circuit from transistor to transistor by correcting a gradation voltage in accordance with a voltage set in advance in a signal-level holding capacitor as a voltage dependent on the threshold voltage of the driving transistor and setting the corrected gradation voltage in the driving transistor as a voltage appearing between the gate and source electrodes of the driving transistor in a pixel circuit having the configuration described above.

In addition, Japanese Patent Laid-open No. 2005-345722, Japanese Patent Laid-open No. 2006-215213 and Japanese Patent Laid-open No. 2007-133282 propose a method for compensating a pixel circuit for variations of the threshold voltage of the driving transistor in the pixel circuit from transistor to transistor in the same way.

If the compensation preparing process, the threshold-voltage variation compensation process, the mobility variation compensation process and the gradation-voltage setting operation are carried out on pixel circuits 17 of the ith pixel-matrix row, pixel circuits 17(i+1) of the (i+1)th pixel-matrix row, pixel circuits 17(i+2) of the (i+2)th pixel-matrix row, pixel circuits 17(i+3) of the (i+3)th pixel-matrix row and so on sequentially on a row-after-row basis, that is, one gradation-voltage setting operation carried out at one time on one pixel-matrix row, within every horizontal scan period 1H in order to set gradations in the pixel circuits 17, the pixel circuits 17(i+1), the pixel circuits 17(i+2), the pixel circuits 17(i+3) and so on so as shown in FIGS. 20A to 20E, however, it is feared that sufficient time cannot be allocated to the threshold-voltage variation compensation process of compensating a pixel circuit for variations of the threshold voltage Vth of the driving transistor in the pixel circuit from transistor to transistor in the case of a high image displaying resolution of the image displaying apparatus. This is because, in the case-of a high image displaying resolution of the image displaying apparatus, the length of the horizontal scan period becomes short.

In order to solve the problem raised by the method explained above by referring to FIGS. 20A to 20E, as one of conceivable solution methods, a typical method to be explained below by referring to FIGS. 21A to 21E has been proposed. In accordance with this typical conceivable solution method, after the threshold-voltage variation compensation process of compensating a pixel circuit for variations of the threshold voltage Vth of the driving transistor in the pixel circuit from transistor to transistor on a plurality of particular consecutive pixel-matrix rows at the same time, the gradation-voltage setting operation is carried out on pixel circuits of each of the particular consecutive pixel-matrix rows. The number of particular consecutive pixel-matrix rows subjected to the threshold-voltage variation compensation process carried out at the same time to compensate a pixel circuit for variations of the threshold voltage Vth of the driving transistor in the pixel circuit from transistor to transistor and the gradation-voltage setting operation carried out at separated times after the execution of the threshold-voltage variation compensation process is 2. To put it concretely, as depicted by a timing chart of FIG. 22C given as a comparison with the timing chart of FIG. 19C, the predetermined reference voltage Vofs, the gradation voltage Vsig (i) representing the gradation of a pixel circuit on the ith pixel-matrix row and the gradation voltage Vsig (i+1) representing the gradation of a pixel circuit on the next (i+1)th pixel-matrix row immediately following the ith pixel-matrix row are asserted successively on their respective signal lines Sig as driving signals Ssig. That is to say, in a period of asserting the predetermined reference voltage Vofs on the signal line SIG as the signal-line driving signal Ssig, each of the compensation preparing process and the threshold-voltage variation compensation process of compensating the pixel circuit for variations of the threshold voltage Vth of the driving transistor in the pixel circuit from transistor to transistor is carried out on the driving transistors of the two consecutive ith and (i+1)th pixel-matrix rows at the same time. Then, in a period of asserting the gradation voltage Vsig (i) on the signal line SIG as the signal-line driving signal Ssig, the gradation-voltage setting operation is carried out on the ith pixel-matrix row and, in the following period of asserting the gradation voltage Vsig (i+1) on the signal line SIG as the signal-line driving signal Ssig, the gradation-voltage setting operation is carried out on the next (i+1)th pixel-matrix row.

If the threshold-voltage variation compensation process of compensating a pixel circuit for variations of the threshold voltage Vth of the driving transistor in the pixel circuit from transistor to transistor on a plurality of consecutive pixel-matrix rows at the same time, however, it is known that there are subtle differences in light luminance between the pixel-matrix rows and, as a result, horizontal-direction cords from are generated, causing the quality of the image to deteriorate.

SUMMARY OF THE INVENTION

Addressing the problems described above, inventors of the present invention have innovated an image displaying apparatus capable of preventing horizontal-direction cords from being generated on the screen of the image displaying apparatus in order to effectively eliminate deteriorations of the image being displayed on the screen during simultaneous execution of a compensation preparing process and a process of compensating pixel circuits for variations of threshold voltages of driving transistors employed in the pixel circuits on a plurality of pixel-matrix rows at the same time by swapping a timing to carry out a gradation-voltage setting operation on any specific pixel-matrix row as an operation lagging behind the threshold-voltage variation compensation process, which has been carried out on all pixel-matrix rows at the same time, with a timing to carry out a gradation-voltage setting operation on a pixel-matrix row adjacent to the specific pixel-matrix row as an operation lagging behind the threshold-voltage variation compensation process in a time-axis direction (and/or a scan-line direction), and innovated an image displaying method adopted by such an image displaying apparatus.

In order to solve the problems described above, in accordance with an embodiment of the present invention, there is provided an image displaying apparatus for displaying a desired image on an image displaying section employed in the image displaying apparatus by making use of a signal-line driving circuit and a scan-line driving circuit to drive pixel circuits laid out on the image displaying section to form a pixel matrix. Each of the pixel circuits employs at least a light emitting device, a signal-level holding capacitor, a driving transistor for driving the light emitting device and a signal writing transistor which can be put in a state of being turned on by a write signal output by the scan-line driving circuit. The signal-line driving circuit and the scan-line driving circuit drive each of the pixel circuits so as to put the light emitting device employed in the pixel circuit in a no-light emission state of emitting no light in a no-light emission period and a light emission state of emitting light in a light emission period repeatedly in an alternating manner. In the no-light emission period, after execution of a threshold-voltage variation compensation process of compensating a pixel circuit for variations of the threshold voltage of the driving transistor in the pixel circuit from transistor to transistor by setting a voltage appearing between the two terminals of the signal-level holding capacitor at a voltage dependent on the threshold voltage of the driving transistor, a gradation-voltage setting operation is carried out by putting the signal writing transistor in a state of being turned on, correcting a gradation voltage representing the luminance of light emitted by the light emitting device by making use of the voltage set in advance between the two terminals of the signal-level holding capacitor as the voltage dependent on the threshold voltage of the driving transistor and newly setting the corrected gradation voltage between the gate and source electrodes of the driving transistor. In the light emission period, on the other hand, the driving transistor drives the light emitting device to emit light at a luminance representing a gradation corresponding to the corrected gradation voltage set between the two terminals of the signal-level holding capacitor. In the no-light emission period, the signal-line driving circuit and the scan-line driving circuit drive the pixel circuits on a plurality of any specific pixel-matrix rows in the image displaying section in order to carry out the threshold-voltage variation compensation process at the same time and, then, drive the pixel circuits on the specific pixel-matrix rows sequentially on a row-after-row basis in order to carry out the gradation-voltage setting operation on one of the pixel-matrix rows at one time for every one of the pixel-matrix rows. In addition, in the no-light emission period, the signal-line driving circuit and the scan-line driving circuit drive the pixel circuits on the specific pixel-matrix rows in the image displaying section also in order to interchange a timing to carry out the gradation-voltage setting operation on one of the specific pixel-matrix rows as an operation lagging behind the threshold-voltage variation compensation process, which has been carried out on all the specific pixel-matrix rows at the same time, with a timing to carry out the gradation-voltage setting operation on another one of the specific pixel-matrix rows as an operation lagging behind the threshold-voltage variation compensation process in a time-axis direction and/or a scan-line direction.

In addition, in accordance with another embodiment of the present invention, there is provided an image displaying method to be adopted in an image displaying apparatus for displaying a desired image on an image displaying section employed in the image displaying apparatus by making use of a signal-line driving circuit and a scan-line driving circuit to drive pixel circuits laid out on the image displaying section to form a pixel matrix. Each of the pixel circuit employs at least a light emitting device, a signal-level holding capacitor, a driving transistor for driving the light emitting device and a signal writing transistor which can be put in a state of being turned on by a write signal output by the scan-line driving circuit. The image displaying method includes the steps of: carrying out to control the signal-line driving circuit and the scan-line driving circuit in order to execute a no-light emission step of driving each of the pixel circuits so as to put the light emitting device employed in the pixel circuit into a no-light emission state of emitting no light in a no-light emission period and a light emission step of driving the pixel circuit so as to put the light emitting device employed in the pixel circuit in a light emission state of emitting light in a light emission period repeatedly in an alternating manner; at the no-light emission step, after execution of a threshold-voltage variation compensation process of compensating a pixel circuit for variations of the threshold voltage of the driving transistor in the pixel circuit from transistor to transistor by setting a voltage appearing between the two terminals of the signal-level holding capacitor at a voltage dependent on the threshold voltage of the driving transistor, carrying out a gradation-voltage setting operation by putting the signal writing transistor in a state of being turned on, correcting a gradation voltage representing the luminance of light emitted by the light emitting device by making use of the voltage set in advance between the two terminals of the signal-level holding capacitor as the voltage dependent on the threshold voltage of the driving transistor and newly setting the corrected gradation voltage between the gate and source electrodes of the driving transistor. The method further includes the steps of: at the light emission step, by the driving transistor, driving the light emitting device to emit light at a luminance representing a gradation corresponding to the corrected gradation voltage set between the two terminals of the signal-level holding capacitor; at the no-light emission step, by the signal-line driving circuit and the scan-line driving circuit, driving the pixel circuits on a plurality of any specific pixel-matrix rows in the image displaying section in order to carry out the threshold-voltage variation compensation process at the same time, and driving the pixel circuits on the specific pixel-matrix rows sequentially on a row-after-row basis in order to carry out the gradation-voltage setting operation on one of the pixel-matrix rows at one time for every one of the pixel-matrix rows; at the no-light emission step, by the signal-line driving circuit and the scan-line driving circuit, driving the pixel circuits on the specific pixel-matrix rows in the image displaying section also in order to interchange a timing to carry out the gradation-voltage setting operation on one of the specific pixel-matrix rows as an operation lagging behind the threshold-voltage variation compensation process, which has been carried out on all the specific pixel-matrix rows at the same time, with a timing to carry out the gradation-voltage setting operation on another one of the specific pixel-matrix rows as an operation lagging behind the threshold-voltage variation compensation process in a time-axis direction and/or a scan-line direction.

According to the image displaying apparatus provided in accordance the above-mentioned embodiment of the present invention and the image displaying method provided in accordance with the above-mentioned embodiment of the present invention to serve as a method adopted by the image displaying apparatus, it is possible to diminish the appearance of subtle differences in emitted-light luminance between a plurality of pixel-matrix rows on which the threshold-voltage variation compensation process is carried out at the same time. As a result, it is possible to prevent horizontal-direction cords from being generated on the screen of the image displaying apparatus due to the differences in emitted-light luminance in order to effectively eliminate deteriorations of the quality of an image being displayed on the screen.

In accordance with an embodiment of the present invention, by carrying out a threshold-voltage variation compensation process of compensating a pixel circuit for variations of the threshold voltage of a driving transistor in the pixel circuit from transistor to transistor on a plurality of any specific pixel-matrix rows in the image displaying section of the image displaying apparatus at the same time, it is possible to prevent horizontal-direction cords from being generated on the screen of the image displaying apparatus in order to effectively eliminate deteriorations of the quality of an image being displayed on the screen.

BRIEF DESCRIPTION OF THE DRAWINGS

FIGS. 4A1 to 4F2 are timing charts of signals and states for the ith and (i+1)th pixel-matrix rows of the image displaying apparatus shown in the block diagram of FIG. 2;

FIGS. 5A1 to 5F2 are timing charts of signals and states for the ith and (i+1)th pixel-matrix rows of an image displaying apparatus according to a second embodiment of the present invention;

FIGS. 12A1 to 12E2 are explanatory diagrams showing timings to carry out a threshold-voltage variation compensation process and a gradation-voltage setting operation on a plurality of pixel-matrix rows in the image displaying section shown in the block diagram of FIG. 11;

FIGS. 15A1 to 15E2 are explanatory diagrams showing timings to carry out a threshold-voltage variation compensation process and a gradation-voltage setting operation on a plurality of pixel-matrix rows in an image displaying apparatus according to a seventh embodiment of the present invention;

FIGS. 19A1 to 19F2 are timing charts of signals and states for the ith and (i+1)th pixel-matrix rows of the image displaying apparatus shown in the block diagram of FIG. 18;

FIGS. 22A1 to 22F2 are timing charts of signals and states for the ith and (i+1)th pixel-matrix rows of the image displaying apparatus designed to solve the problems raised by the image displaying apparatus shown in the block diagram of FIG. 18 to serve as timing charts for the timings shown in the explanatory diagram of FIGS. 21A to 21E.

DETAILED DESCRIPTION OF THE PREFERRED EMBODIMENTS

Preferred embodiments of the present invention are explained by appropriately referring to diagrams as follows.

First Embodiment (1) Configuration of First Embodiment

Figures 1A, 1B, 1C, 1D, 1E:
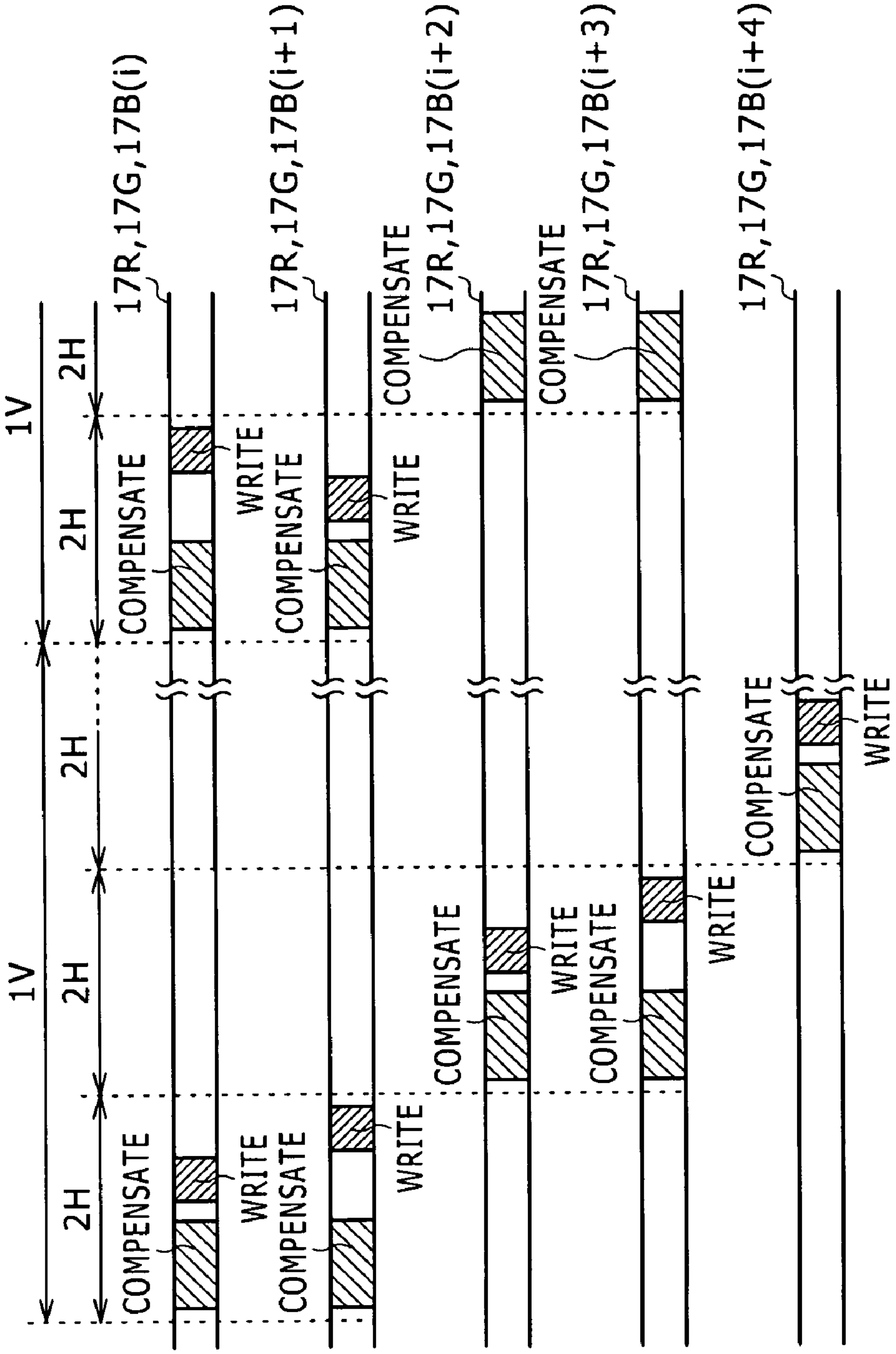
FIGS. 1A to 1E are explanatory diagrams showing timings to carry out a threshold-voltage variation compensation process and a gradation-voltage setting operation on a plurality of pixel-matrix rows in an image displaying apparatus according to a first embodiment of the present invention.
Figure 2:
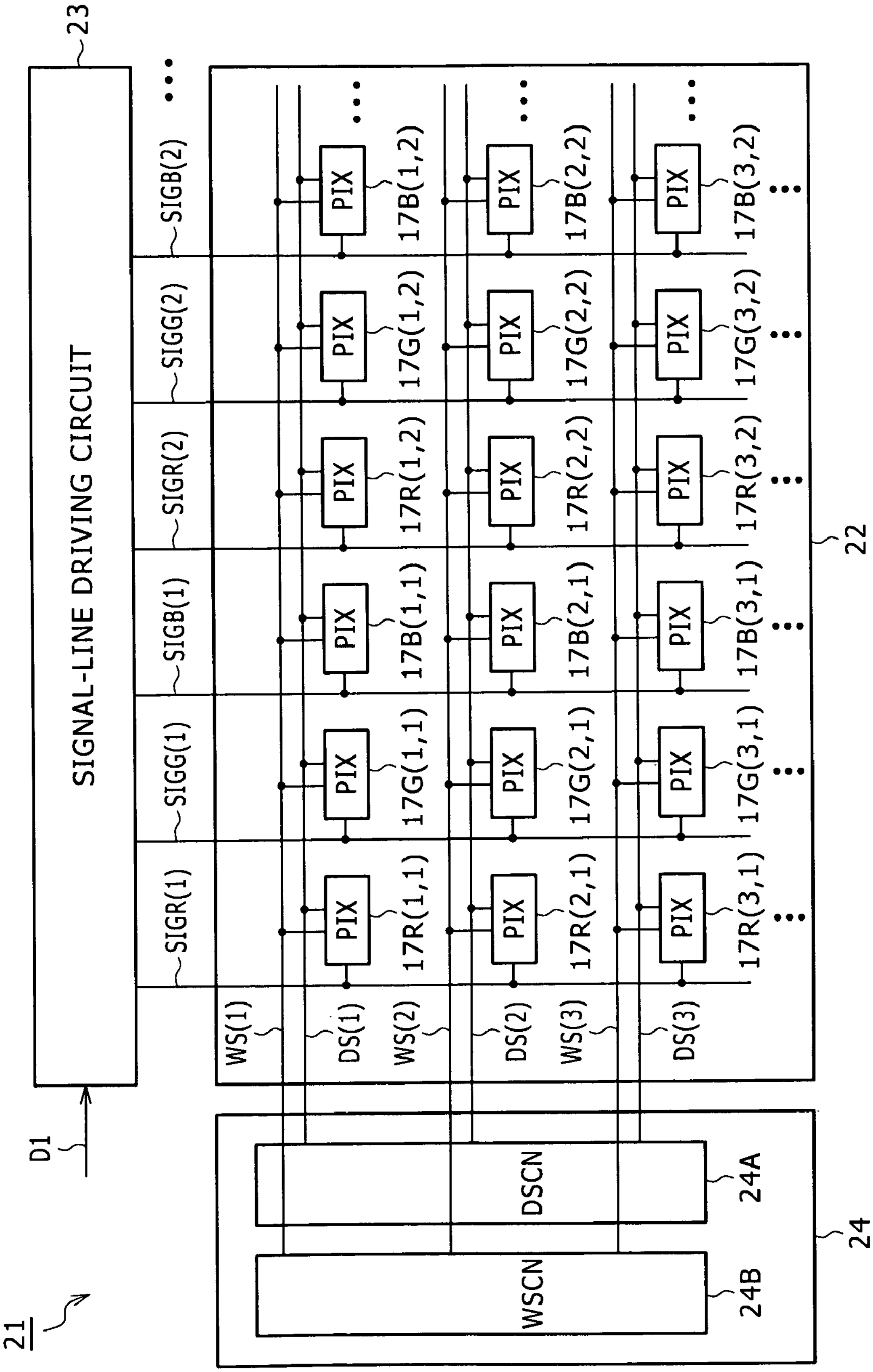
FIG. 2 is a block diagram showing the image displaying apparatus according to the first embodiment of the present invention.

FIG. 2 is a block diagram showing an image displaying apparatus 21 according to a first embodiment of the present invention. The image displaying apparatus 21 employs an image displaying section 22 created on an insulating substrate determined in advance. In addition, the image displaying apparatus 21 is also provided with a signal-line driving circuit 23 and a scan-line driving circuit 24 which are created at locations surrounding the image displaying section 22. The image displaying section 22 is created to include a pixel matrix obtained as a result of arranging red-color pixel circuits 17R, green-color pixel circuits 17G and blue-color pixel circuits 17B. Unless specified otherwise, in the lagging behind description, the capitals R, G and B are abbreviations for the red, green and blue colors respectively. In the block diagram of FIG. 2, each of the red-color pixel circuits 17R, the green-color pixel circuits 17G and the blue-color pixel circuits 17B is denoted by reference notation PIX. Each of the red-color pixel circuits 17R, the green-color pixel circuits 17G and the blue-color pixel circuits 17B has a configuration identical with that of the pixel circuit 17 employed in the image displaying apparatus 11 shown in the block diagram of FIG. 18. However, each of the red-color pixel circuits 17R emits light having a wavelength unique to the red-color pixel circuits 17R. By the same token, each of the red-color pixel circuits 17G emits light having a wavelength unique to the red-color pixel circuits 17G. In the same way, each of the red-color pixel circuits 17B emits light having a wavelength unique to the red-color pixel circuits 17B.

Figure 3:
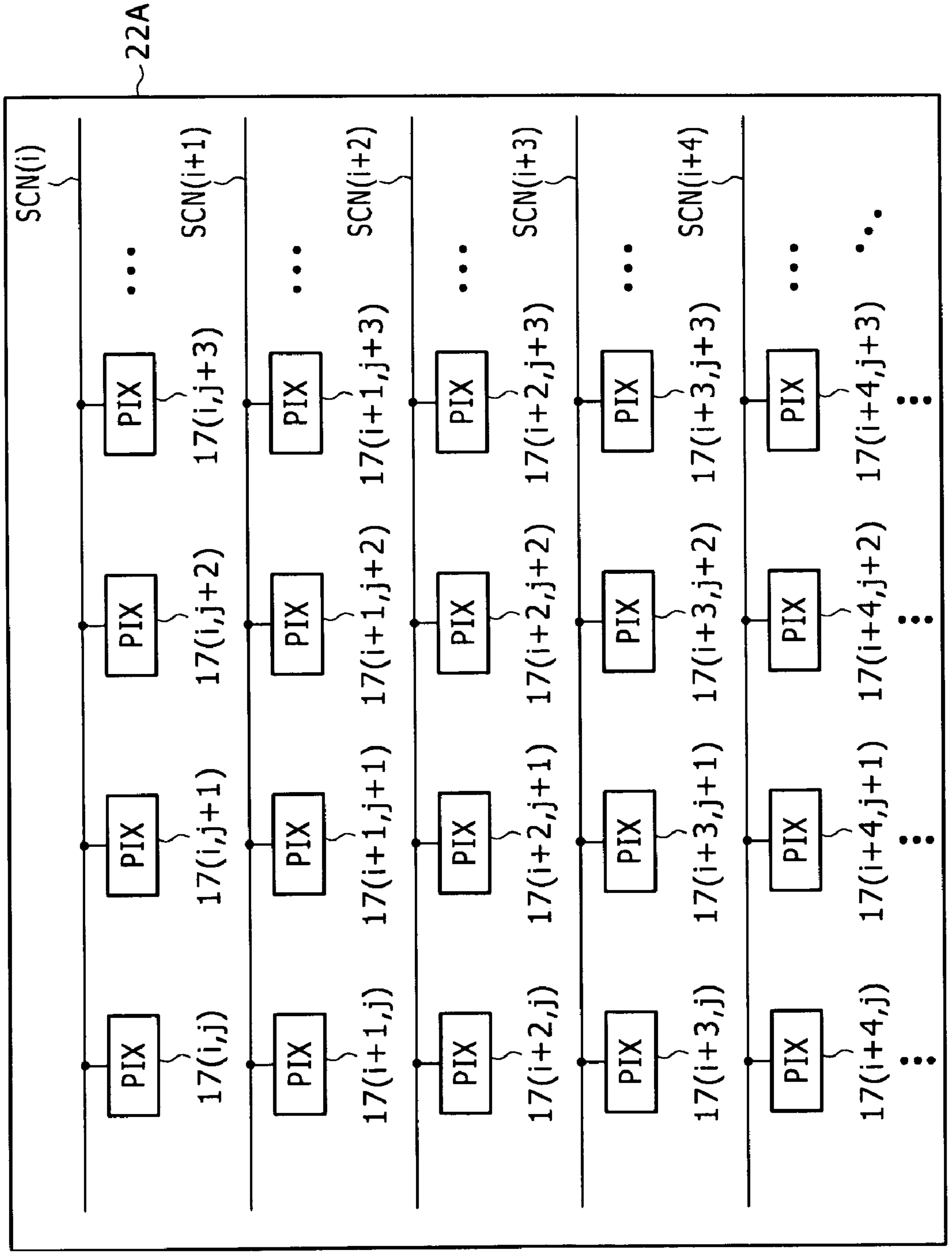
FIG. 3 is a block diagram showing the top view of an image displaying section created to include a pixel matrix obtained as a result of sequentially arranging monochromatic pixel circuits in place of red-color pixel circuits, green-color pixel circuits and blue-color pixel circuits in an image displaying section employed in the image displaying apparatus shown in the block diagram of FIG. 2.
Figure 4C:
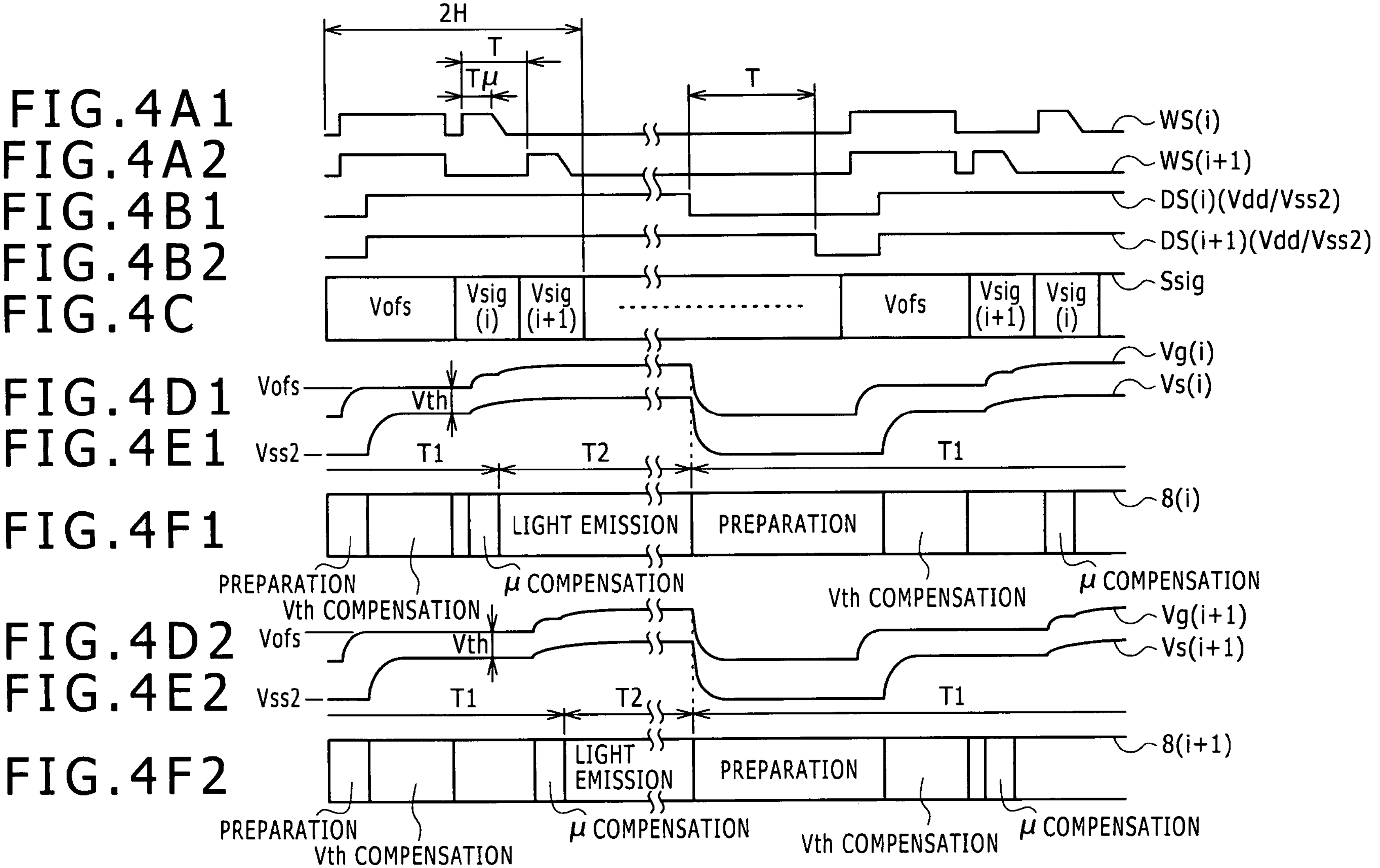
Figure 5C:
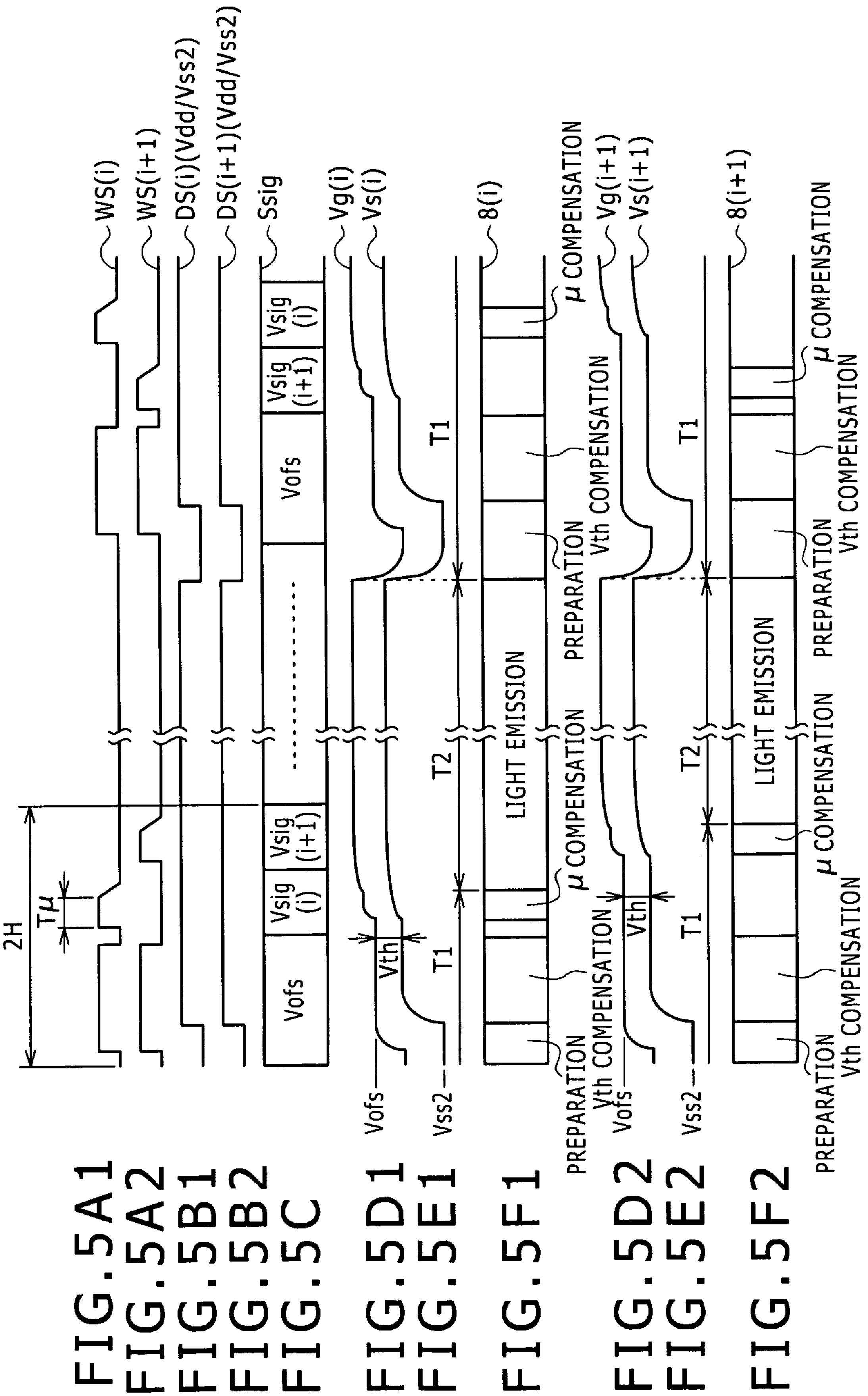

FIG. 3 is a block diagram showing the top view an image displaying section 22A created to include a pixel matrix obtained as a result of sequentially arranging monochromatic pixel circuits 17 in place of the red-color pixel circuits 17R, the green-color pixel circuits 17G and the blue-color pixel circuits 17B in the image displaying section 22 employed in the image displaying apparatus 21 shown in the block diagram of FIG. 2. That is to say, the present invention can be applied to a wide range of image displaying sections including the image displaying section 22A shown in the block diagram of FIG. 3.

FIGS. 1A to 1E are diagrams to be compared with the diagrams of FIGS. 21A to 21E. As shown in the diagrams of FIGS. 1A to 1E, in the image displaying section 22 of the first embodiment, a threshold-voltage variation compensation process of compensating a pixel circuit for variations of the threshold voltage Vth of a driving transistor in the pixel circuit from transistor to transistor is carried out on a plurality of any two adjacent pixel-matrix rows at the same time. In the diagrams of FIGS. 1A to 1E, the two adjacent pixel-matrix rows are the ith and (i+1)th pixel-matrix rows. Another example of the two adjacent pixel-matrix rows is the (i+2)th and (i+3)th pixel-matrix rows. In addition, a timing to carry out a gradation-voltage setting operation lagging behind a threshold-voltage variation compensation process to serve as an operation to set a gradation in each of the red-color pixel circuits 17R, the green-color pixel circuits 17G and the blue-color pixel circuits 17B on the first one of any specific two adjacent pixel-matrix rows is swapped with a timing to carry out a gradation-voltage setting operation lagging behind the threshold-voltage variation compensation process to serve as an operation to set a gradation in each of the red-color pixel circuits 17R, the green-color pixel circuits 17G and the blue-color pixel circuits 17B on the second one of the specific two adjacent pixel-matrix rows in the time-axis direction.

To put it more concretely, in this embodiment, the number of adjacent pixel-matrix rows is set at two as is obvious from the description given above. In the diagrams of FIGS. 1A to 1E, a 1V period corresponds to one field. Let the field on the left-hand side of the diagrams of FIGS. 1A to 1E be an odd-numbered field whereas the field on the right-hand side of the diagrams of FIGS. 1A to 1E be an even-numbered field. Pixel circuits 17R(i), 17G(i) and 17B(i) are respectively red, green and blue-color pixel circuits on the ith pixel-matrix row whereas pixel circuits 17R(i+1), 17G(i+1) and 17B(i+1) are respectively red, green and blue-color pixel circuits on. the (i+1)th pixel-matrix row immediately following the ith pixel-matrix row. In this case, the threshold-voltage (Vth) compensation process is carried out at the same time on the 17R(i), 17G(i), 17B(i), 17R(i+1), 17G(i+1) and 17B(i+1) in each of the fields.

In the odd-numbered field, however, the timing to carry out a gradation-voltage setting operation lagging behind a threshold-voltage variation compensation process to serve as an operation to set a gradation in each of the red-color pixel circuits 17R, the green-color pixel circuits 17G and the blue-color pixel circuits 17B on the ith pixel-matrix row is controlled to lead ahead of the timing to carry out a gradation-voltage setting operation lagging behind a threshold-voltage variation compensation process to serve as an operation to set a gradation in each of the red-color pixel circuit 17R(i+1), the green-color pixel circuit 17G(i+1) and the blue-color pixel circuit 17B(i+1) on the (i+1)th pixel-matrix row.

In the even-numbered field, on the other hand, the timing to carry out a gradation-voltage setting operation lagging behind a threshold-voltage variation compensation process to serve as an operation to set a gradation in each of the red-color pixel circuits 17R, the green-color pixel circuits 17G and the blue-color pixel circuits 17B on the ith pixel-matrix row is controlled to reversely lag behind the timing to carry out a gradation-voltage setting operation lagging behind a threshold-voltage variation compensation process to serve as an operation to set a gradation in each of the red-color pixel circuit 17R(i+1), the green-color pixel circuit 17G(i+1) and the blue-color pixel circuit 17B(i+1) on the (i+1)th pixel-matrix row.

That is to say, in a transition from any particular field to a field immediately lagging behind the particular field, a timing to carry out the gradation-voltage setting operation on the ith pixel-matrix row is interchanged with a timing to carry out the gradation-voltage setting operation on the (i+1)th pixel-matrix row in the time-axis direction.

FIGS. 4A1 to 4F2 is a timing diagram showing a plurality of timing charts of signals and states for the ith and (i+1)th pixel-matrix rows in conformity with the description given above. Image data D1 to be apportioned to any one of the signal lines SIG is converted into an analog signal in a digital-to-analog conversion process and asserted to the signal line SIG as a gradation voltage Vsig. As depicted by a timing chart of FIG. 4C, the signal-line driving circuit 23 asserts the gradation voltage Vsig generated by a horizontal selector employed in the signal-line driving circuit 23 but not shown in the timing diagram of the figure on the signal line SIG as a signal-line driving signal Ssig representing image data D1. It is to be noted that the signal-line driving signal Ssig can be the gradation voltage Vsig representing the image data D1 or the predetermined reference voltage Vofs described previously. As depicted by the timing chart of FIG. 4C, the timings to sequentially assert Vsig (i) followed by Vsig (i+1) on the signal lines SIG (i) and SIG (i+1) respectively in the odd-numbered field on the left-hand side of the timing diagram are exchanged respectively with the timings to sequentially assert Vsig (i+1) and Vsig (i) on the signal lines SIG (i+1) followed by SIG (i) respectively in the even-numbered field on the right-hand side of the timing diagram. In both the odd-numbered and even-numbered fields, the timings of Vsig (i) and Vsig (i+1) lag behind the timing of the predetermined reference voltage Vofs asserted on the signal line SIG to serve as a voltage used for carrying out the threshold-voltage variation compensation process described earlier.

A write scanner 24B (or a WSCN 24B) employed in the scan-line driving circuit 24 of the image displaying apparatus 21 as shown in the block diagram of FIG. 2 swaps a timing pattern depicted on the left-hand side of a timing chart of FIG. 4A1 to serve as a timing pattern of the write scan-line driving signal WS (i) generated for the ith pixel-matrix row in the odd-numbered field and a timing pattern depicted on the left-hand side of a timing chart of FIG. 4A2 to serve as a timing pattern of the write scan-line driving signal WS (i+1) generated for the (i+1)th pixel-matrix row in the odd-numbered field with a timing pattern depicted on the right-hand side of the timing chart of FIG. 4A1 to serve as a timing pattern of the write scan-line driving signal WS (i) generated for the ith pixel-matrix row in the even-numbered field and a timing pattern depicted on the right-hand side of the timing chart of FIG. 4A2 to serve as a timing pattern of the write scan-line driving signal WS (i+1) generated for the (i+1)th pixel-matrix row in the even-numbered field.

On the other hand, a drive scanner 24A (or a DSCN 24B) employed in the scan-line driving circuit 24 of the image displaying apparatus 21 as shown in the block diagram of FIG. 2 generates a timing pattern depicted by a timing chart of FIG. 4B1 to serve as a timing pattern of the drive scan-line driving signal DS (i) generated for the ith pixel-matrix row as a timing pattern common to both the odd-numbered and even-numbered fields. By the same token, the scan-line driving circuit 24 generates another timing pattern depicted by a timing chart of FIG. 4B2 to serve as a timing pattern of the drive scan-line driving signal DS (i+1) generated for the (i+1)th pixel-matrix row as a timing pattern common to both the odd-numbered and even-numbered fields. However, the falling edge of the drive scan-line driving signal DS (i) sets the end of a light emission period T2 depicted by a timing chart of FIG. 4F1 as the light emission period T2 of the ith pixel-matrix row whereas the falling edge of the drive scan-line driving signal DS (i+1) sets the end of a light emission period T2 depicted by a timing chart of FIG. 4F2 as the light emission period T2 of the (i+1)th pixel-matrix row. Thus, the falling edge of the drive scan-line driving signal DS (i) and the falling edge of the drive scan-line driving signal DS (i+1) are to be swapped with each other in each transition from a particular field to a field lagging behind the particular field to make the average length of the light emission period T2 of the ith pixel-matrix row equal to the light emission period T2 of the (i+1)th pixel-matrix row.

(2) Operations of First Embodiment

In the configuration of the image displaying apparatus 21 shown in the block diagram of FIG. 2, the signal-line driving circuit 23 and the scan-line driving circuit 24 drive pixel circuits provided on the image displaying section 22 to serve as the red-color pixel circuits 17R, the green-color pixel circuits 17G and the blue-color pixel circuits 17B in order to set the gradation voltage Vsig asserted on each of the signal lines SIG connected to the red-color pixel circuits 17R, the green-color pixel circuits 17G and the blue-color pixel circuits 17B so that the organic EL device 8 employed in each of the red-color pixel circuits 17R, the green-color pixel circuits 17G and the blue-color pixel circuits 17B emits light with a luminance according to the set gradation voltage Vsig in an operation to display a desired image on the image displaying section 22 in the so-called light emission period.

To put it in detail, during a no-light emission period T1 shown in the timing diagram of FIGS. 4A1 to 4F2, the specific terminal of the signal-level holding capacitor C1 employed in each of the red-color pixel circuits 17R, the green-color pixel circuits 17G and the blue-color pixel circuits 17B in the image displaying apparatus 21 is set at the gradation voltage Vsig in the gradation-voltage setting operation described earlier, and a voltage applied between the terminals of the signal-level holding capacitor C1 to appear as the gate-source voltage Vgs of the driving transistor TR1 puts the driving transistor TR1 in an operating state of driving the organic EL device 8. Thus, in the image displaying apparatus 21, the organic EL device 8 employed in each of the red-color pixel circuits 17R, the green-color pixel circuits 17G and the blue-color pixel circuits 17B emits light with a luminance according to the gradation voltage Vsig asserted on the signal line SIG and set on the specific terminal of the signal-level holding capacitor C1 employed in the same pixel circuit 17 as the organic EL device 8.

Before the gradation voltage Vsig is set on the specific terminal of the signal-level holding capacitor C1 in the gradation-voltage setting operation as described above, the voltage applied between the terminals of the signal-level holding capacitor C1 is set at a magnitude at least equal to the threshold voltage Vth of the driving transistor TR1 in a compensation preparing process of preparing for the threshold-voltage variation compensation process of setting the voltage applied between the terminals of the signal-level holding capacitor C1 is set at a magnitude equal to the threshold voltage Vth in order to compensate a pixel circuit 17 for variations of the threshold voltage Vth of the driving transistor TR1 in the pixel circuit 17 from transistor to transistor. In the threshold-voltage variation compensation process immediately lagging behind the compensation preparing process, in the image displaying apparatus 21, a current flowing through the source electrode of the driving transistor TR1 according to a voltage applied between the terminals of the signal-level holding capacitor C1 to appear as the gate-source voltage Vgs of the driving transistor TR1 electrically charges the other terminal of the signal-level holding capacitor C1, setting the voltage between the terminals of the signal-level holding capacitor C1 at the threshold voltage Vth of the driving transistor TR1. Thus, in the threshold-voltage variation compensation process carried out in the image displaying apparatus 21, the voltage between the terminals of the signal-level holding capacitor C1 is set at the threshold voltage Vth of the driving transistor TR1 in order to compensate the pixel circuit 17 for variations of the threshold voltage Vth of the driving transistor TR1 in the pixel circuit 17 from transistor to transistor.

Then, in the image displaying apparatus 21, the gate electrode of the driving transistor TR1 is electrically connected to the signal line SIG in order to set the specific terminal of the signal-level holding capacitor C1 at the gradation voltage Vsig in the so-called gradation-voltage setting operation. In this gradation-voltage setting operation, the gradation voltage Vsig is corrected in accordance with the voltage set in advance between the terminals of the signal-level holding capacitor C1 as a voltage equal to threshold voltage Vth of the driving transistor TR1 and the corrected gradation voltage Vsig is then applied between the terminals of the signal-level holding capacitor C1. Thus, in the image displaying apparatus 21, the pixel circuit 17 is compensated for variations of the threshold voltage Vth of the driving transistor TR1 in the pixel circuit 17 from transistor to transistor in order to effectively prevent the quality of the image from deteriorating.

During a period Tμ in the course of the gradation-voltage setting operation to set the voltage appearing between the terminals of the signal-level holding capacitor C1 at the gradation voltage Vsig asserted on the signal line SIG, the power-supply voltage Vdd is supplied from the drive scanner 16B to the drain of the driving transistor TR1 in order to correct the voltage applied between the terminals of the signal-level holding capacitor C1 in the so-called mobility variation compensation process of compensating the pixel circuit 17 for variations of the mobility μ of the driving transistor TR1 in the pixel circuit 17 from transistor to transistor.

After the threshold-voltage variation compensation process of compensating the pixel circuit 17 for variations of the threshold voltage Vth of the driving transistor TR1 in the pixel circuit 17 from transistor to transistor has been carried out on a plurality of adjacent pixel-matrix rows at the same time, the gradation-voltage setting operation including the mobility variation compensation process is carried out on the adjacent pixel-matrix rows sequentially on a row-after-row basis, that is, one gradation-voltage setting operation carried out at one time on one pixel-matrix row, in order to set a gradation in each of the pixel circuits 17 on the adjacent pixel-matrix rows. Thus, even if the length of the horizontal scan period becomes shorter due to the increased number of pixel-matrix rows in an image displaying apparatus with a high image displaying resolution, it is possible to allocate sufficiently long time to the threshold-voltage variation compensation process of compensating a pixel circuit 17 for variations of the threshold voltage Vth of the driving transistor TR1 in the pixel circuit 17 from transistor to transistor. As a result, it is possible to compensate a pixel circuit 17 for emitted-light luminance variations caused by the variations of the threshold voltage Vth of the driving transistor TR1 in the pixel circuit 17 from transistor to transistor and to display an image having a high quality.

By simply providing a configuration in which, after the threshold-voltage variation compensation process of compensating a pixel circuit 17 for variations of the threshold voltage Vth of the driving transistor TR1 in the pixel circuit 17 from transistor to transistor has been carried out on a plurality of adjacent pixel-matrix rows at the same time, the gradation-voltage setting operation including the mobility variation compensation process is merely carried out on the adjacent pixel-matrix rows sequentially on a row-after-row basis, that is, one gradation-voltage setting operation carried out at one time on one pixel-matrix row, in order to set a gradation in each of the pixel circuits 17 on the adjacent pixel-matrix rows as described above, however, there are subtle differences in emitted-light luminance between pixel-matrix rows. Thus, horizontal-direction cords from are undesirably generated on the screen of the image displaying apparatus 21. As a result, deteriorations of the quality of an image being displayed on the screen will occur.

In order to solve the problem described above, for any specific two adjacent pixel-matrix rows subjected to a threshold-voltage variation compensation process carried out at the same time on the two adjacent pixel-matrix rows to compensate each pixel circuit 17 for variations of the threshold voltage Vth of the driving transistor TR1 in the pixel circuit 17 from transistor to transistor in the image displaying apparatus 21, as shown in the diagrams of FIGS. 1A to 1E, a timing to carry out a gradation-voltage setting operation lagging behind the threshold-voltage variation compensation process to serve as an operation to set a gradation in each of the red-color pixel circuits 17R, the green-color pixel circuits 17G and the blue-color pixel circuits 17B on the first one of any specific two adjacent pixel-matrix rows is swapped with a timing to carry out a gradation-voltage setting operation lagging behind the threshold-voltage variation compensation process to serve as an operation to set a gradation in each of the red-color pixel circuits 17R, the green-color pixel circuits 17G and the blue-color pixel circuits 17B on the second one of the specific two adjacent pixel-matrix rows in the time-axis direction. Thus, the average time between the threshold-voltage variation compensation process and the gradation-voltage setting operation becomes uniform for the red-color pixel circuits 17R, the green-color pixel circuits 17G and the blue-color pixel circuits 17B on the specific two adjacent pixel-matrix rows. As a result, it is possible to diminish the appearance of subtle differences in emitted-light luminance between a plurality of adjacent pixel-matrix rows on which the threshold-voltage variation compensation process is carried out at the same time. Therefore, it is possible to prevent horizontal-direction cords from being generated on the screen of the image displaying apparatus 21 due to the differences in emitted-light luminance in order to effectively eliminate deteriorations of the quality of an image being displayed on the screen.

To put it more concretely, in the image displaying apparatus 21, any specific two adjacent pixel-matrix rows are subjected to a threshold-voltage variation compensation process carried out at the same time to compensate each pixel circuit 17 for variations of the threshold voltage Vth of the driving transistor TR1 in the pixel circuit 17 from transistor to transistor. In addition, in a transition from any particular field to a field immediately lagging behind the particular field, a timing to carry out the gradation-voltage setting operation on one of the two adjacent pixel-matrix rows is interchanged with a timing to carry out the gradation-voltage setting operation on the other adjacent pixel-matrix row in the time-axis direction.

Due to the operation to swap a timing to carry out the gradation-voltage setting operation on one of the two adjacent pixel-matrix rows with a timing to carry out the gradation-voltage setting operation on the other adjacent pixel-matrix row, the starts of the light emission periods in the adjacent pixel-matrix rows are also swapped with each other in the time-axis direction. Thus, it is necessary to swap the ends of the light emission periods in the adjacent pixel-matrix rows by taking the swapped starts of the light emission periods into consideration as explained earlier by referring to the timing charts of FIGS. 4F1 and 4F2 so that the length of the light emission period becomes uniform for all the adjacent pixel-matrix rows. It is therefore possible to diminish the appearance of subtle differences in emitted-light luminance between a plurality of adjacent pixel-matrix rows on which the threshold-voltage variation compensation process is carried out at the same time. As a result, it is possible to prevent horizontal-direction cords from being generated on the screen of the image displaying apparatus 21 due to the differences in emitted-light luminance in order to effectively eliminate deteriorations of the quality of an image being displayed on the screen.

(3) Effects of First Embodiment

In accordance with the configuration described above, for any specific two adjacent pixel-matrix rows subjected to a threshold-voltage variation compensation process carried out at the same time on the two adjacent pixel-matrix rows to compensate each pixel circuit 17 for variations of the threshold voltage Vth of the driving transistor TR1 in the pixel circuit 17 from transistor to transistor in the image displaying apparatus 21, a timing to carry out a gradation-voltage setting operation lagging behind the threshold-voltage variation compensation process to serve as an operation to set a gradation in each of the pixel circuits 17 on the first one of any specific two adjacent pixel-matrix rows is swapped with a timing to carry out a gradation-voltage setting operation lagging behind the threshold-voltage variation compensation process to serve as an operation to set a gradation in each of the pixel circuits 17 on the second one of the specific two adjacent pixel-matrix rows in the time-axis direction. Thus, it is possible to diminish the appearance of subtle differences in emitted-light luminance between a plurality of adjacent pixel-matrix rows on which the threshold-voltage variation compensation process is carried out at the same time. As a result, it is possible to prevent horizontal-direction cords from being generated on the screen of the image displaying apparatus 21 due to the differences in emitted-light luminance in order to effectively eliminate deteriorations of the quality of an image being displayed on the screen.

In addition, in the compensation preparing process of preparing for the threshold-voltage variation compensation process, the signal writing transistor TR5 is put in a state of being turned on in order to set the specific terminal of the signal-level holding capacitor C1 at a voltage determined in advance and, at the same time, a voltage appearing on the other terminal of the signal-level holding capacitor C1 is lowered by dropping the power-supply voltage applied to the drain electrode of the driving transistor TR1 so that the voltage appearing between the terminals of the signal-level holding capacitor C1 is set at a magnitude at least equal to the threshold voltage Vth of the driving transistor TR1. Then, in the threshold-voltage variation compensation process lagging behind the compensation preparing process, the voltage appearing between the terminals of the signal-level holding capacitor C1 is set at a magnitude equal to the threshold voltage Vth of the driving transistor TR1. Thus, by designing the pixel circuit 17 into a simple configuration employing only two transistors, i.e., the signal writing transistor TR5 and the driving transistor TR1, it is possible to prevent horizontal-direction cords from being generated on the screen of the image displaying apparatus 21 in order to effectively eliminate deteriorations of the quality of an image being displayed on the screen.

On top of that, in a manner of being interlocked with the operation to swap the timing to carry out the gradation-voltage setting operation on any specific pixel-matrix row with the timing to carry out the gradation-voltage setting operation on a pixel-matrix row adjacent to the specific pixel-matrix row, the timing to end the light emission for the specific pixel-matrix row is swapped with the timing to end the light emission for the adjacent pixel-matrix row. Thus, the length of the light emission period can be made uniform for all pixel circuits on a plurality of adjacent pixel-matrix rows so that the quality of the image can be further improved.

To put it more concretely, let the number of adjacent pixel-matrix rows be set at two, for example. In this case, in a transition from a particular field to a field immediately lagging behind the particular field, a timing to carry out the gradation-voltage setting operation on a specific one of the two adjacent pixel-matrix rows is swapped with a timing to carry out the gradation-voltage setting operation on the other one of the two adjacent pixel-matrix rows in the time-axis direction. That is to say, the time-axis order of the timings to carry out the threshold-voltage variation compensation process and the gradation-voltage setting operation on a specific one of the two adjacent pixel-matrix rows is swapped with the time-axis order of the timings to carry out the threshold-voltage variation compensation process and the gradation-voltage setting operation on the other one of the two adjacent pixel-matrix rows so that it is possible to diminish the appearance of subtle differences in emitted-light luminance between the adjacent pixel-matrix rows. As a result, it is possible to prevent horizontal-direction cords from being generated on the screen of the image displaying apparatus 21 due to the differences in emitted-light luminance in order to effectively eliminate deteriorations of the quality of an image being displayed on the screen.

Second Embodiment

FIGS. 5A1 to 5F2 are timing charts of signals and states for the ith and (i+1)th pixel-matrix rows in an image displaying apparatus according to a second embodiment in the same way as the explanatory timing diagram of FIGS. 4A1 to 4F2 for the image displaying apparatus 21 according to the first embodiment. In the case of the image displaying apparatus according to the second embodiment, for any specific two adjacent pixel-matrix rows subjected to a threshold-voltage variation compensation process carried out at the same time on the two adjacent pixel-matrix rows to compensate each pixel circuit for variations of the threshold voltage Vth of the driving transistor TR1 in the pixel circuit from transistor to transistor in the image displaying apparatus 21, the timing of the falling edge of the drive scan-line driving signal DS (i) depicted by a timing chart of FIG. 5B1 as the timing chart of the ith pixel-matrix row is controlled to coincide with the timing of the falling edge of the drive scan-line driving signal DS (i+1) depicted by a timing chart of FIG. 5B2. Otherwise, the image displaying apparatus according to the second embodiment is identical with the image displaying apparatus 21 according to the first embodiment.

That is to say, it is desirable to provide a uniform length of the light emission period to give an emitted-light luminance uniform for all pixel-matrix rows as is the case with the image displaying apparatus 21 according to the first embodiment. In order to make the configuration simple, however, the timing of the falling edge of the drive scan-line driving signal DS (i)

of the ith pixel-matrix row can be set to coincide with the timing of the falling edge of the drive scan-line driving signal DS (i+1) of the (i+1)th pixel-matrix row as is the case with the image displaying apparatus according to the second embodiment provided that the lengths of the light emission periods which are different from each other are each sufficient from a practical point of view.

As is obvious from the description given above, for any specific two adjacent pixel-matrix rows subjected to a threshold-voltage variation compensation process carried out at the same time on the two adjacent pixel-matrix rows to compensate each pixel circuit for variations of the threshold voltage Vth of the driving transistor TR1 in the pixel circuit from transistor to transistor in the image displaying apparatus 21, a timing to carry out a gradation-voltage setting operation lagging behind the threshold-voltage variation compensation process to serve as an operation to set a gradation in each of the pixel circuits on the first one of the two adjacent pixel-matrix rows is swapped with a timing to carry out a gradation-voltage setting operation lagging behind the threshold-voltage variation compensation process to serve as an operation to set a gradation in each of the pixel circuit on the second one of the specific two adjacent pixel-matrix rows in the time-axis direction in the same way as the image displaying apparatus according 21 according to the first embodiment. In the case of the image displaying apparatus according to the second embodiment, however, the end of the light emission time of one of the two adjacent pixel-matrix rows is set to coincide with the end of the light emission time of the other adjacent pixel-matrix row in order to make the configuration even simpler. Thus, much like the image displaying apparatus according 21 the first embodiment, it is possible to diminish the appearance of subtle differences in emitted-light luminance between the adjacent pixel-matrix rows. As a result, it is possible to prevent horizontal-direction cords from being generated on the screen of the image displaying apparatus 21 due to the differences in emitted-light luminance in order to effectively eliminate deteriorations of the quality of an image being displayed on the screen.

Third Embodiment

FIGS. 6A to 6E are explanatory diagrams referred to in description of operations carried out by an image displaying apparatus according to a third embodiment as the explanatory diagrams of FIGS. 1A to 1E are referred to in description of operations carried out by the image displaying apparatus 21 according to the first embodiment. In the case of the image displaying apparatus according to the third embodiment, any specific three adjacent pixel-matrix rows subjected to a threshold-voltage variation compensation process carried out at the same time on the specific three adjacent pixel-matrix rows to compensate each pixel circuit for variations of the threshold voltage Vth of the driving transistor TR1 in the pixel circuit from transistor to transistor. In addition, the timings to carry out the gradation-voltage setting operations on the three adjacent pixel-matrix rows are interchanged with each other with each other sequentially by rotating the timings over the three adjacent pixel-matrix rows in order to change the time-axis order of executions of three gradation-voltage setting operations, which are carried out on the three adjacent pixel-matrix rows respectively, sequentially as described below.

It is to be noted that FIGS. 7A to 7E also provided for the image displaying apparatus according to the third embodiment is an explanatory diagram to be compared with the explanatory diagrams of FIGS. 6A to 6E. As shown in the explanatory diagrams of FIGS. 6A to 6E, the timings to carry out the three gradation-voltage setting operations on the three adjacent pixel-matrix rows respectively are interchanged with each other sequentially by rotating the timings over the three adjacent pixel-matrix rows in a transition from an odd-numbered field to an even-numbered field. As shown in the explanatory diagrams of FIGS. 7A to 7E, on the other hand, the order of the timings to carry out the three gradation-voltage setting operations on the three adjacent pixel-matrix rows respectively is reversed in a transition from an odd-numbered field to an even-numbered field.

Figures 6A, 6B, 6C, 6D, 6E:
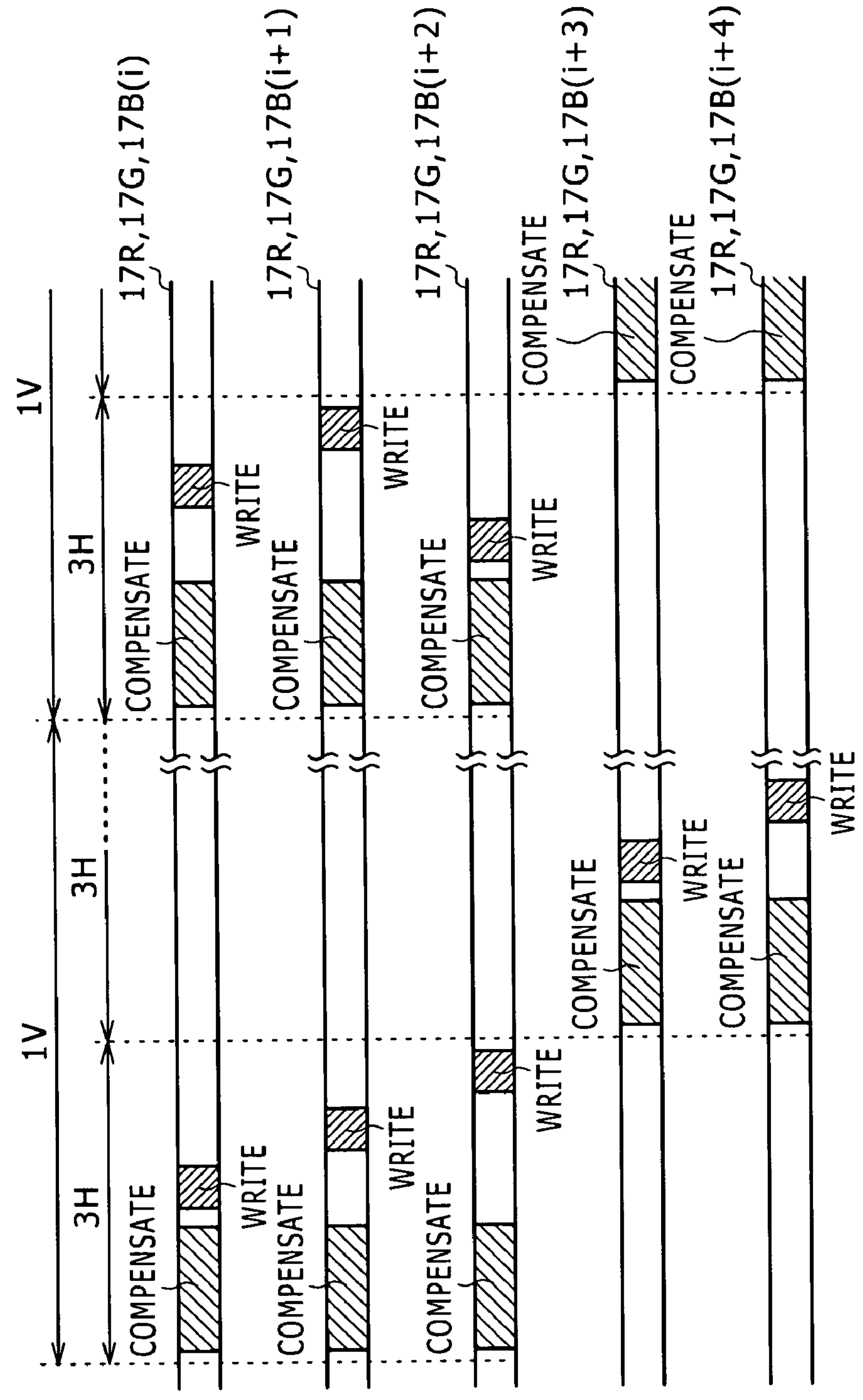
FIGS. 6A to 6E are explanatory diagrams showing timings to carry out a threshold-voltage variation compensation process and a gradation-voltage setting operation on a plurality of pixel-matrix rows in an image displaying apparatus according to a third embodiment of the present invention.
Figures 7A, 7B, 7C, 7D, 7E:
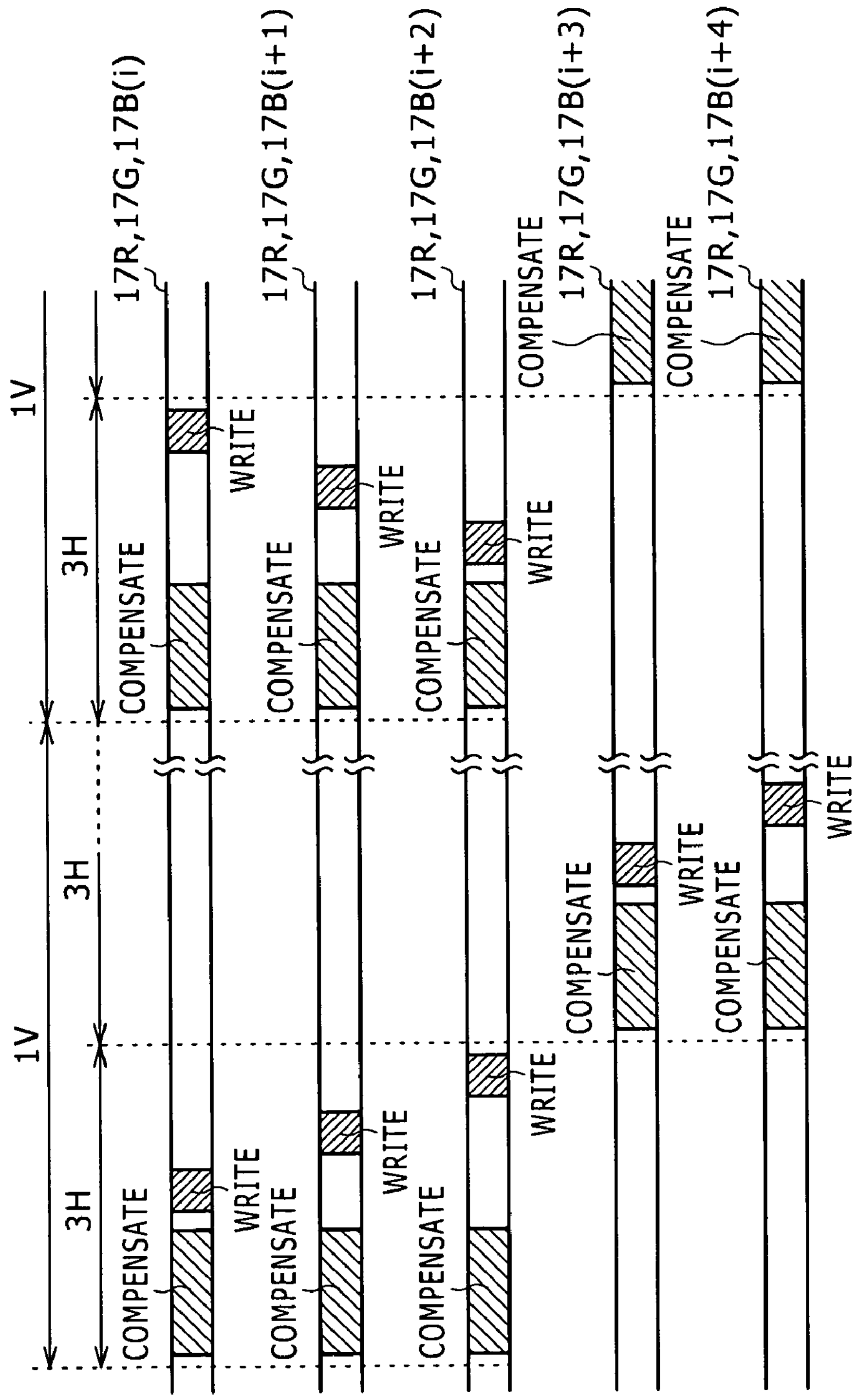
FIGS. 7A to 7E are explanatory diagrams showing other timings to carry out a threshold-voltage variation compensation process and a gradation-voltage setting operation on a plurality of pixel-matrix rows in an image displaying apparatus according to the third embodiment of the present invention.
Figures 8A, 8B, 8C, 8D, 8E:
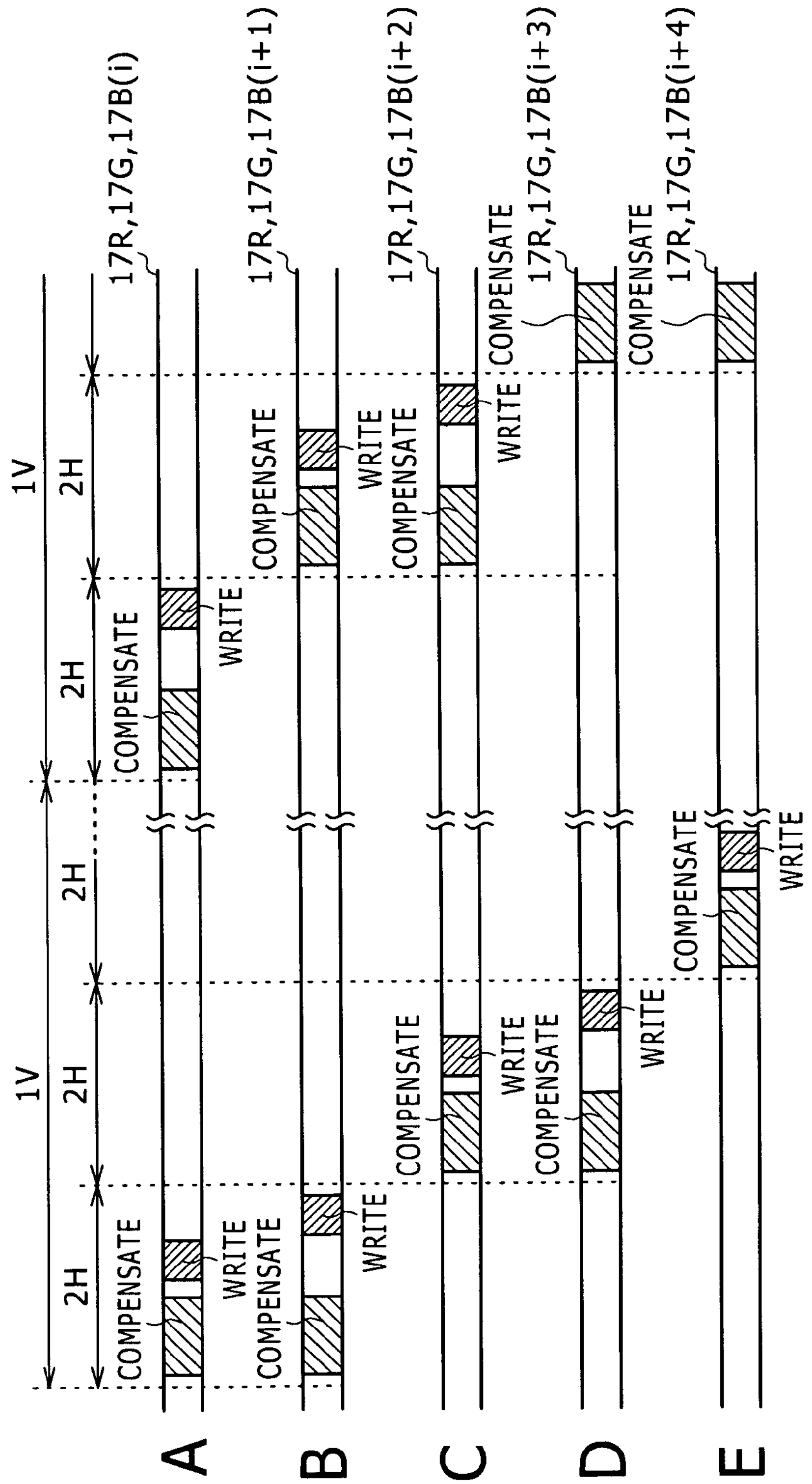
FIGS. 8A to 8E are explanatory diagrams showing timings to carry out a threshold-voltage variation compensation process and a gradation-voltage setting operation on a plurality of pixel-matrix rows in an image displaying apparatus according to a fourth embodiment of the present invention.

The configuration of the image displaying apparatus according to the third embodiment is basically identical with the configurations of the image displaying apparatus according to the first and second embodiments described earlier except that, in the case of the third embodiment, the threshold-voltage variation compensation process is carried out at the same time on any specific three adjacent pixel-matrix rows and that the timings to carry out the three gradation-voltage setting operations on the three adjacent pixel-matrix rows respectively are interchanged with each other sequentially as described by referring to the diagrams of FIGS. 6A and 7E.

Even though the image displaying apparatus according to the third embodiment interchanges the timings to carry out the three gradation-voltage setting operations on the three adjacent pixel-matrix rows respectively with each other sequentially as described above, the image displaying apparatus according to the third embodiment gives the same effects as the image displaying apparatus according to the first and second embodiments described earlier.

To put it in detail, even though the image displaying apparatus according to the third embodiment interchanges the timings to carry out the three gradation-voltage setting operations on the three adjacent pixel-matrix rows respectively with each other sequentially by rotating the timings over the three adjacent pixel-matrix rows in a transition from an odd-numbered field to an even-numbered field as shown in the explanatory diagrams of FIGS. 6A to 6E or reverses the order of the timings to carry out the three gradation-voltage setting operations on the three adjacent pixel-matrix rows respectively in a transition from an odd-numbered field to an even-numbered field as shown in the explanatory diagrams of FIGS. 7A to 7E, the image displaying apparatus according to the third embodiment gives the same effects as the first and second embodiments described earlier.

Fourth Embodiment

FIGS. 8A to 8E are explanatory diagrams referred to in description of operations carried out by an image displaying apparatus according to a fourth embodiment as the explanatory diagrams of FIGS. 1A to 1E is referred to in description of operations carried out by the image displaying apparatus 21 according to the first embodiment. In the image displaying apparatus according to the fourth embodiment, in a period of 2H, after the threshold-voltage variation compensation process of compensating a pixel circuit for variations of the threshold voltage Vth of the driving transistor TR1 in the pixel circuit from transistor to transistor has been carried out on any two adjacent pixel-matrix rows at the same time, the gradation-voltage setting operation is carried out on the two adjacent pixel-matrix rows sequentially on a row-after-row basis, that is, one gradation-voltage setting operation carried out at one time on one pixel-matrix row, in order to set a gradation in each of the pixel circuits on the adjacent pixel-matrix rows in the same way as the image displaying apparatus according to the first and second embodiments. In the case of the image displaying apparatus according to the fourth embodiment, however, the timings of the threshold-voltage variation compensation process and the gradation-voltage setting operation are changed differently from the image displaying apparatus according to the first and second embodiments. To put it concretely, the timings of the gradation-voltage setting operations carried out on the two adjacent pixel-matrix rows are swapped with each other in the same way as the first and second embodiments and, on top of that, the timings of the threshold-voltage variation compensation process and the gradation-voltage setting operation which are carried out on each of the two adjacent pixel-matrix rows in any even-numbered field are shifted backward in the time-axis direction by a time displacement corresponding to the period of 2H to result in timings to carry out the threshold-voltage variation compensation process and the gradation-voltage setting operation on each of the two adjacent pixel-matrix rows in an odd-numbered field immediately lagging behind the even-numbered field.

The fourth embodiment is basically identical with the first to third embodiments described earlier except for a configuration relevant to the execution of the threshold-voltage variation compensation process and a configuration relevant to the execution of the gradation-voltage setting operation.

In the case of the image displaying apparatus according to the fourth embodiment, in a period of 2H, after the threshold-voltage variation compensation process of compensating a pixel circuit for variations of the threshold voltage Vth of the driving transistor TR1 in the pixel circuit from transistor to transistor has been carried out on any specific two adjacent pixel-matrix rows at the same time, the gradation-voltage setting operation is carried out on the two adjacent pixel-matrix rows sequentially on a row-after-row basis, that is, one gradation-voltage setting operation carried out at one time on one pixel-matrix row. In addition, the timings of the gradation-voltage setting operations carried out on the two adjacent pixel-matrix rows are swapped with each other in the same way as the first and second embodiments and, on top of that, the timings of the threshold-voltage variation compensation process and the gradation-voltage setting operation which are carried out on each of the two adjacent pixel-matrix rows in any even-numbered field are shifted backward in the time-axis direction by a time displacement corresponding to the period of 2H to result in timings to carry out the threshold-voltage variation compensation process and the gradation-voltage setting operation on each of the two adjacent pixel-matrix rows in an odd-numbered field immediately lagging behind the even-numbered field.

Fifth Embodiment

Figures 9A, 9B, 9C, 9D, 9E:
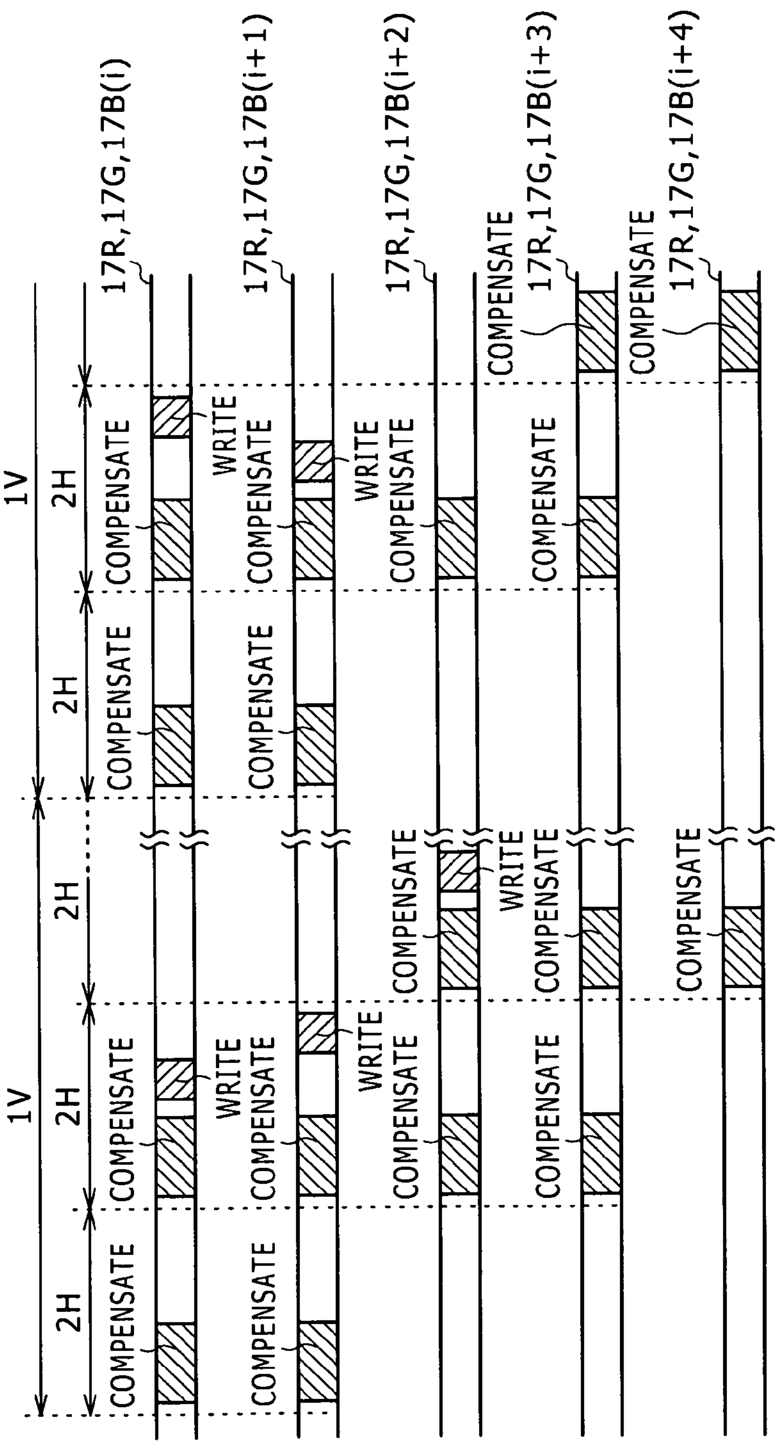
FIGS. 9A to 9E are explanatory diagrams showing timings to carry out a threshold-voltage variation compensation process and a gradation-voltage setting operation on a plurality of pixel-matrix rows in an image displaying apparatus according to a fifth embodiment of the present invention.
Figures 10A, 10B, 10C, 10D, 10E:
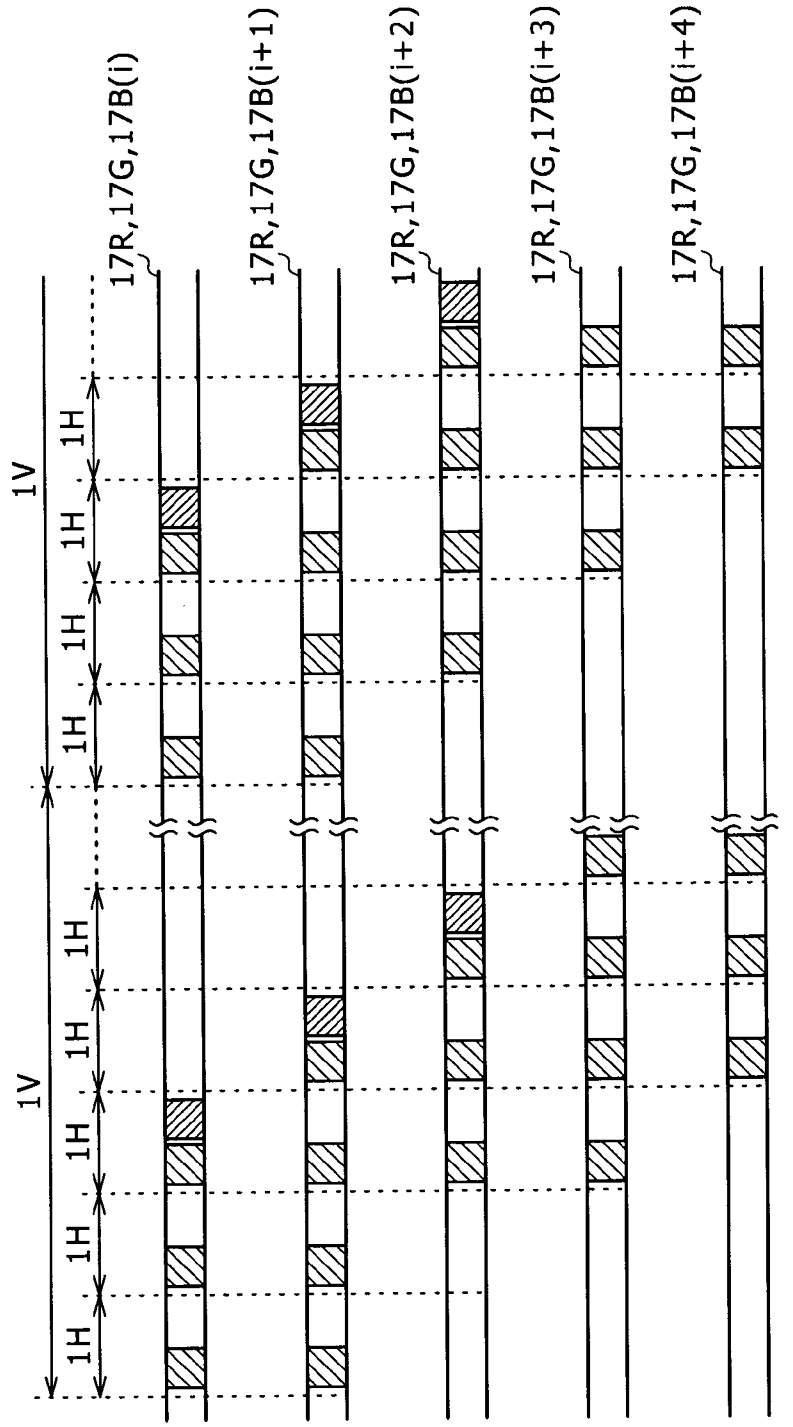
FIGS. 10A to 10E are explanatory diagrams showing other timings to carry out a threshold-voltage variation compensation process and a gradation-voltage setting operation on a plurality of pixel-matrix rows in another image displaying apparatus according to the fifth embodiment of the present invention.

FIGS. 9A to 9C are explanatory diagrams referred to in description of operations carried out by an image displaying apparatus according to a fifth embodiment as the explanatory diagrams of FIGS. 1A to 1E are referred to in description of operations carried out by the image displaying apparatus 21 according to the first embodiment. In the case of the image displaying apparatus according to the fifth embodiment, each pixel circuit operates over a plurality of periods in each of which the driving transistor TR1 gradually charges the other terminal of the signal-level holding capacitor C1 (that is, the terminal connected to the source electrode of the driving transistor TR1 and the anode electrode of the organic EL device 8) so that the voltage applied between the two terminals of the signal-level holding capacitor C1 is eventually set at a magnitude equal to the threshold voltage Vth of the driving transistor TR1. That is to say, the threshold-voltage variation compensation process is executed by dividing the threshold-voltage variation compensation process into sub-processes each carried out in one of the periods. Each consecutive two of such charging periods spent to eventually set the voltage applied between the two terminals of the signal-level holding capacitor C1 at a magnitude equal to the threshold voltage Vth of the driving transistor TR1 sandwich a pause period. It is to be noted that the pause period is a period in which the voltage appearing on the signal line SIG is set at a gradation voltage of another pixel circuit connected to the signal line SIG. During the pause period, in every pixel circuit, the signal writing transistor TR5 is sustained in a state of being turned off and the power-supply voltage Vdd is supplied to the driving transistor TR1. With the signal writing transistor TR5 sustained in a state of being turned off, the gate electrode of the driving transistor TR1 is put in the so-called floating state of electrically disconnecting the gate electrode from the signal line SIG.

The image displaying apparatus according to the fifth embodiment is basically identical with the image displaying apparatus according to the first to fourth embodiments described earlier except for a configuration relevant to the execution of the threshold-voltage variation compensation process of setting the voltage applied between the two terminals of the signal-level holding capacitor C1 at a magnitude equal to the threshold voltage Vth of the driving transistor TR1. It is to be noted that the diagrams of FIGS. 9A to 9E show a configuration in which the threshold-voltage variation compensation process of setting the voltage applied between the two terminals of the signal-level holding capacitor C1 at a magnitude equal to the threshold voltage Vth of the driving transistor TR1 is executed by dividing the threshold-voltage variation compensation process into two sub-processes each carried out in one of two periods whereas the diagrams of FIGS. 10A to 10E show a configuration in which the threshold-voltage variation compensation process of setting the voltage applied between the two terminals of the signal-level holding capacitor C1 at a magnitude equal to the threshold voltage Vth of the driving transistor TR1 is executed by dividing the threshold-voltage variation compensation process into four sub-processes each carried out in one of four periods.

In the case of the image displaying apparatus according to the fifth embodiment, the threshold-voltage variation compensation process of setting the voltage applied between the two terminals of the signal-level holding capacitor C1 at a magnitude equal to the threshold voltage Vth of the driving transistor TR1 is executed by dividing the threshold-voltage variation compensation process into a plurality of sub-processes each carried out in one of the same plurality of periods and as many sub-processes as possible are each carried out at the same time on a plurality of pixel-matrix rows. Thus, even if the horizontal scan period becomes even shorter due to an even higher image displaying resolution of the image displaying apparatus, sufficiently long time in the sub-periods can be allocated to the threshold-voltage variation compensation process so that the image displaying apparatus according to the fifth embodiment is capable of giving the same effects as the image displaying apparatus according to the first to fourth embodiments described earlier.

Sixth Embodiment

Figure 11:
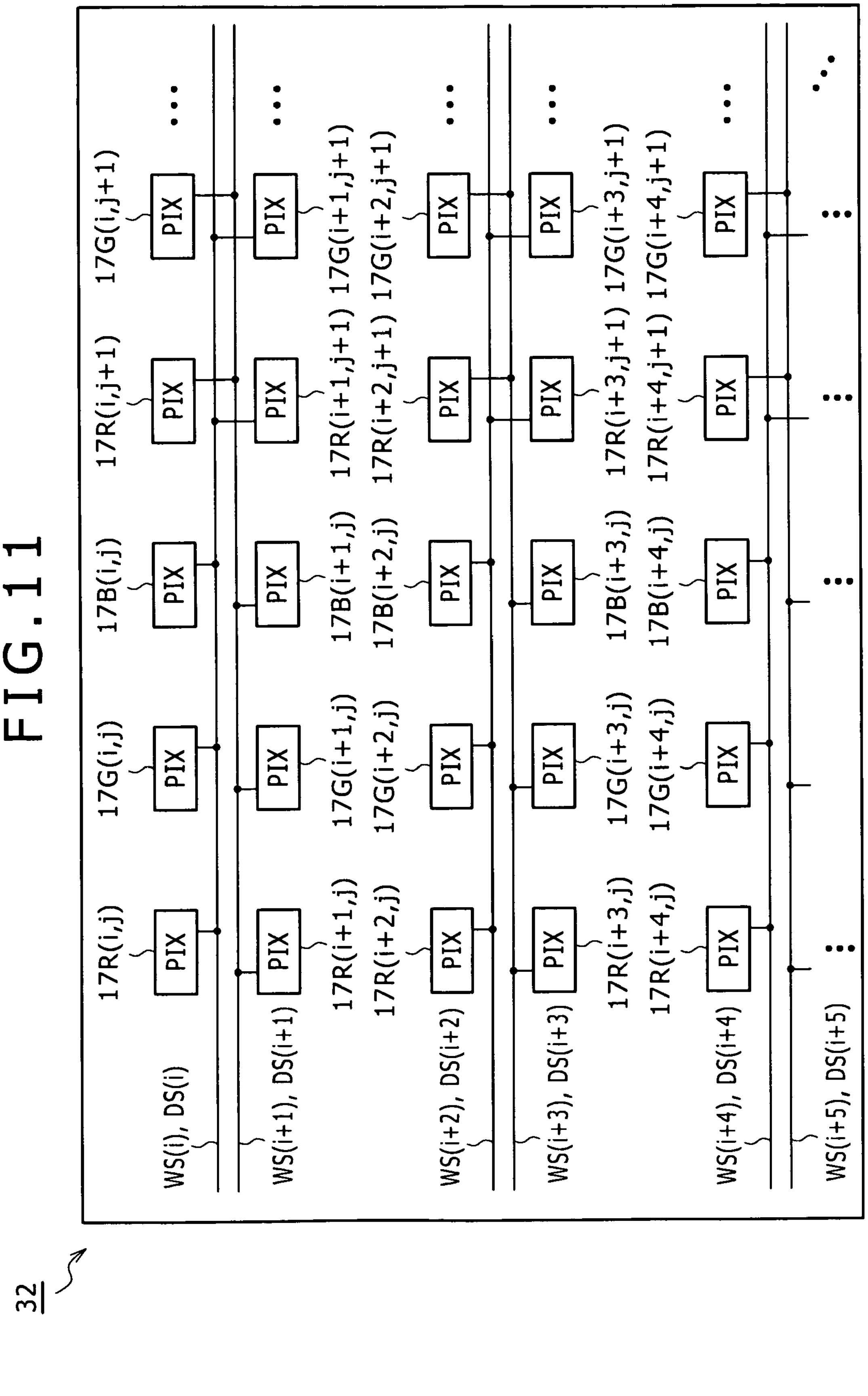
FIG. 11 is a block diagram showing the top view of an image displaying section created to include a pixel matrix obtained as a result of sequentially arranging red-color pixel circuits, green-color pixel circuits and blue-color pixel circuits in an image displaying apparatus according to a sixth embodiment of the present invention.

FIG. 11 is a block diagram which shows the top view of the image displaying section of an image displaying apparatus according to a sixth embodiment of the present invention as the diagram of FIG. 2 shows the top view of the image displaying section 22 of the image displaying apparatus 21 according to the first embodiment of the present invention. The image displaying apparatus according to the sixth embodiment is basically identical with the image displaying apparatus 11 explained earlier by referring to the block diagram of FIG. 18 except that the interconnections of an image displaying section 32 employed in the image displaying apparatus according to the sixth embodiment are different from the image displaying section 12 employed in the image displaying apparatus 11 as described below.

Pixel circuits 17 on a plurality of pixel-matrix rows (k) included in the image displaying section 32 as pixel-matrix rows (k) subjected to the threshold-voltage variation compensation process carried out at the same time are connected to scan lines so that each of two scan lines conveying the driving signals WS (k) and DS (k) respectively on any pixel-matrix row (k) is connected to different pixel circuits 17 arranged in the scan-line direction on the pixel-matrix row (k) where k=i, i+1, i+2 and so on. Thus, the order of timings measured from the timing to carry out the threshold-voltage variation compensation process as the timings to carry out the gradation-voltage setting operations on any specific pixel-matrix row (k) is an order set in the direction of the scan lines and to be swapped with the order of timings measured from the timing to carry out the threshold-voltage variation compensation process as the timings to carry out the gradation-voltage setting operations on an adjacent pixel-matrix row (k+1).

In the image displaying section 32, the two scan lines conveying respectively the driving signals WS (k) and DS (k) to be supplied to upper pixel circuits 17 typically arranged on any odd-numbered pixel-matrix row (k) are bundled with the two scan lines conveying respectively the driving signals WS (k+1) and DS (k+1) to be supplied to lower pixel circuits 17 typically arranged on any odd-numbered pixel-matrix row (k+1) to create bundled scan lines between the pixel-matrix row (k) and the pixel-matrix row (k+1). That is to say, four scan lines are bundled between any pixel-matrix row (k) and a pixel-matrix row (k+1), which are adjacent to each other.

In addition, in the image displaying section 32, a red-color pixel circuit 17R(i, j), a green-color pixel circuit 17G(i, j) and a blue-color pixel circuit 17B(i, j) arranged in the scan-line direction at an intersection of any pixel-matrix row (i) and any pixel-matrix column (j) are treated as a color-pixel set (i, j). In the scan-line direction beginning from the start edge of a raster scan, between the pixel-matrix row (i) and the pixel-matrix row (i+1), the two scan lines conveying respectively the driving signals WS (i) and DS (i) are connected alternately to a color-pixel set (i, j) on the pixel-matrix row (i), a color-pixel set (i+1, j+1) on the pixel-matrix row (i+1), a color-pixel set (i, j+2) on the pixel-matrix row (i) and so on. By the same token, the two scan lines conveying respectively the driving signals WS (i+1) and DS (i+1) are connected alternately to a color-pixel set (i+1, j) on the pixel-matrix row (i+1), a color-pixel set (i, j+1) on the pixel-matrix row (i), a color-pixel set (i+1, j+2) on the pixel-matrix row (i+1) and so on.

The four scan lines bundled between each remaining pair of pixel-matrix rows (k) and (k+1) are connected alternately to color-pixel sets on the pixel-matrix rows (k) and (k+1) in the same way as the four scan lines bundled between the pixel-matrix row (i) and the pixel-matrix row (i+1) described above.

Figure 12:
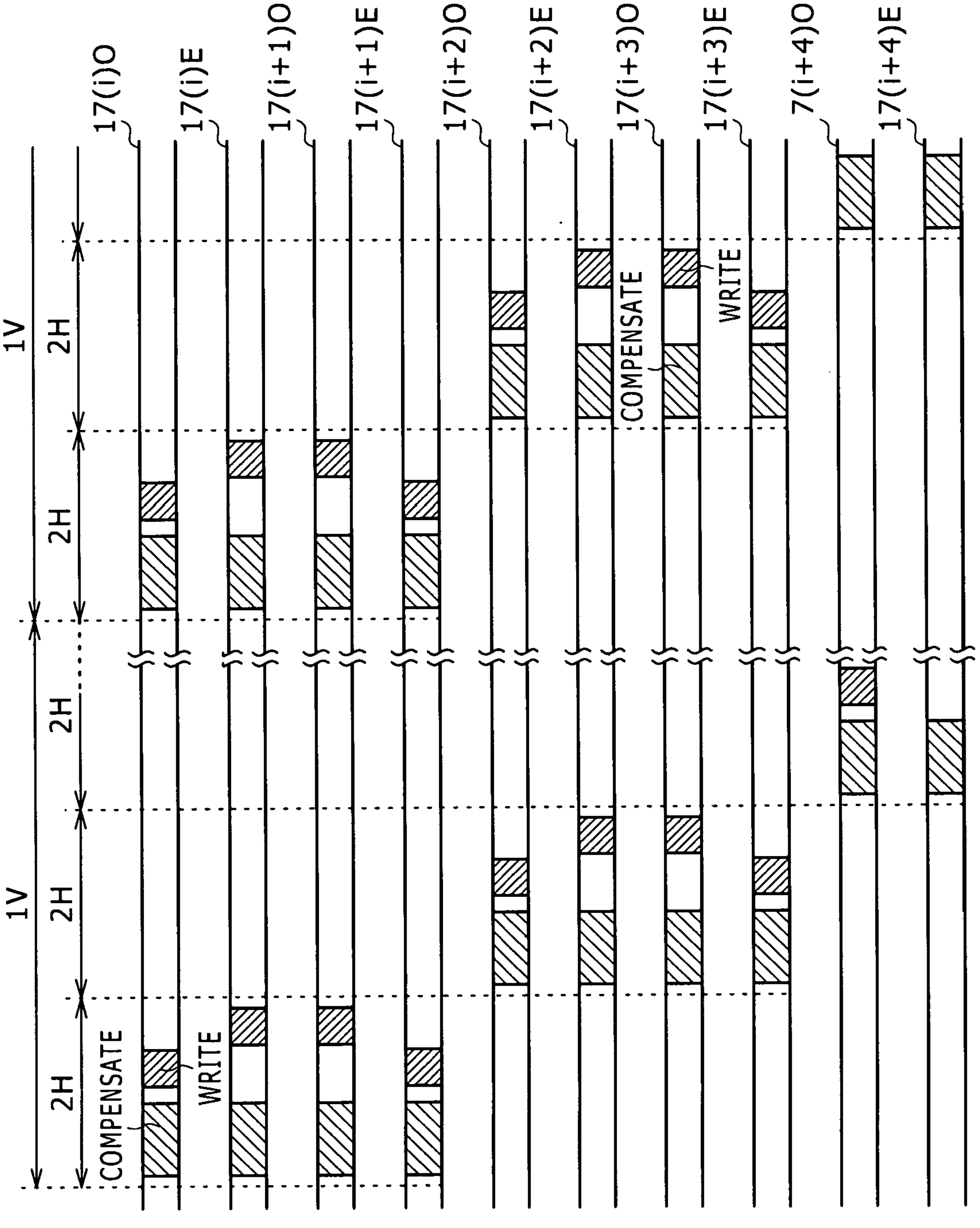

In explanatory diagrams of FIGS. 12A1 to 12E2, reference notation 17(i)O denotes odd-numbered color-pixel sets shown in a sub-diagram of FIG. 12A1 as odd-numbered color-pixel sets on the ith pixel-matrix row whereas reference notation 17(i)E denotes even-numbered color-pixel sets shown in a sub-diagram of FIG. 12A2 as even-numbered color-pixel sets on the ith pixel-matrix row. By the same token, reference notation 17(i+1)O denotes odd-numbered color-pixel sets shown in a sub-diagram of FIG. 12B1 as odd-numbered color-pixel sets on the (i+1)th pixel-matrix row whereas reference notation 17(i+1)E denotes even-numbered color-pixel sets shown in a sub-diagram of FIG. 12B2 as even-numbered color-pixel sets on the (i+1)th pixel-matrix row. In the same way, reference notation 17(i+2)O denotes odd-numbered color-pixel sets shown in a sub-diagram of FIG. 12C1 as odd-numbered color-pixel sets on the (i+2)th pixel-matrix row whereas reference notation 17(i+2)E denotes even-numbered color-pixel sets shown in a sub-diagram of FIG. 12C2 as even-numbered color-pixel sets on the (i+2)th pixel-matrix row.

Thus, on the ith pixel-matrix row, the gradation-voltage setting operation is carried out in an alternating order of odd-numbered, even-numbered, odd-numbered, . . . color-pixel sets. On the (i+1)th pixel-matrix row, on the other hand, the gradation-voltage setting operation is carried out in a reversed alternating order of even-numbered, odd-numbered, even-numbered, . . . color-pixel sets. On the (i+2)th pixel-matrix row, the gradation-voltage setting operation is carried out back in the same alternating order of odd-numbered, even-numbered, odd-numbered, color-pixel sets as the ith pixel-matrix row.

As a result, in the case of the image displaying apparatus according to the sixth embodiment, differences in emitted-light luminance among pixel circuits 17 are spread spatially throughout the image displaying section 32. Therefore, it is possible to prevent horizontal-direction cords from being generated on the screen of the image displaying apparatus in order to effectively eliminate deteriorations of the quality of an image being displayed on the screen.

Figure 13:
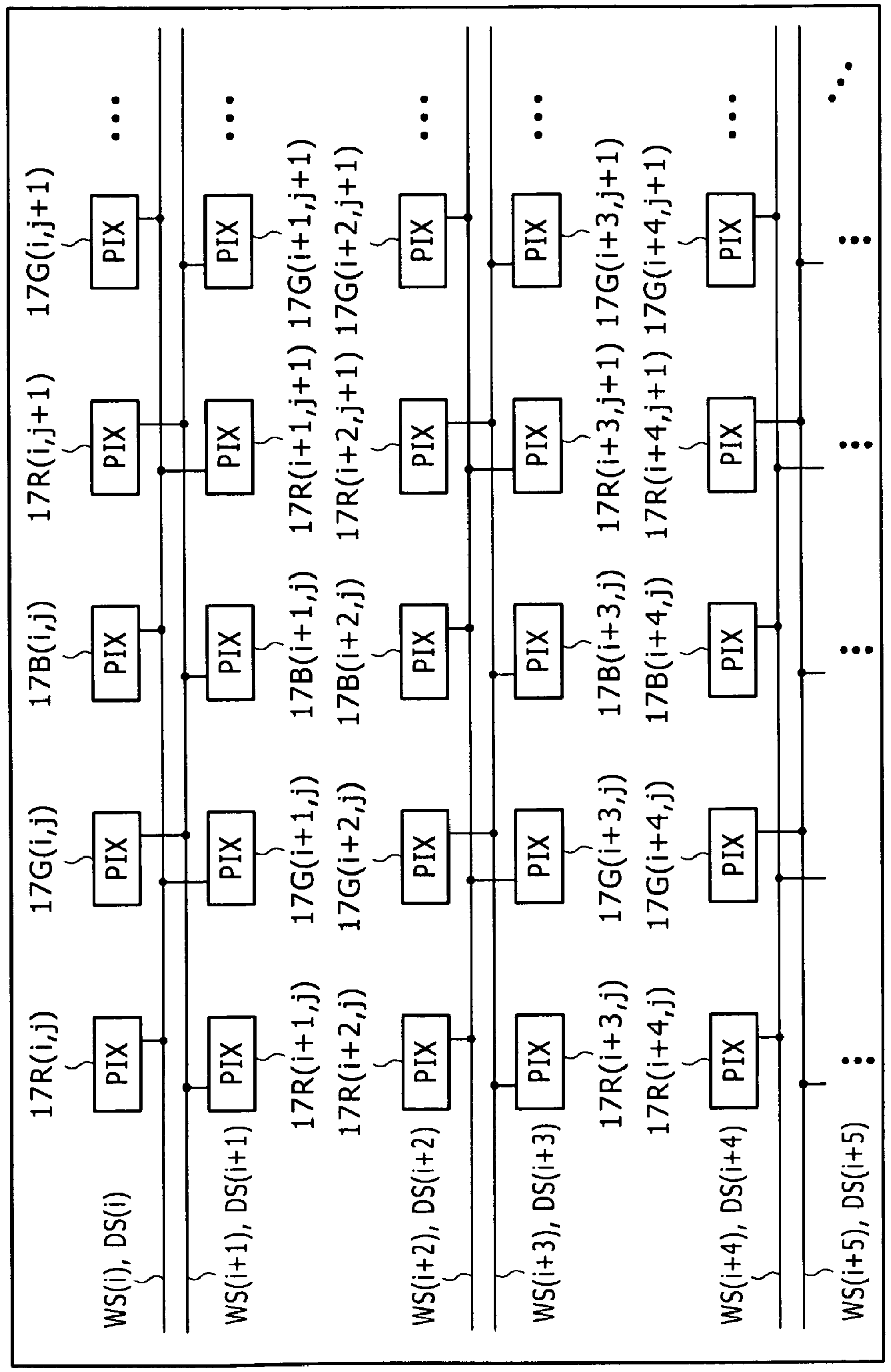
FIG. 13 is a block diagram showing the top view of another image displaying section created to include a pixel matrix obtained as a result of sequentially arranging red-color pixel circuits, green-color pixel circuits and blue-color pixel circuits in an image displaying apparatus according to the sixth embodiment of the present invention in a way different from the image displaying section shown in the block diagram of FIG. 11.
Figure 14:
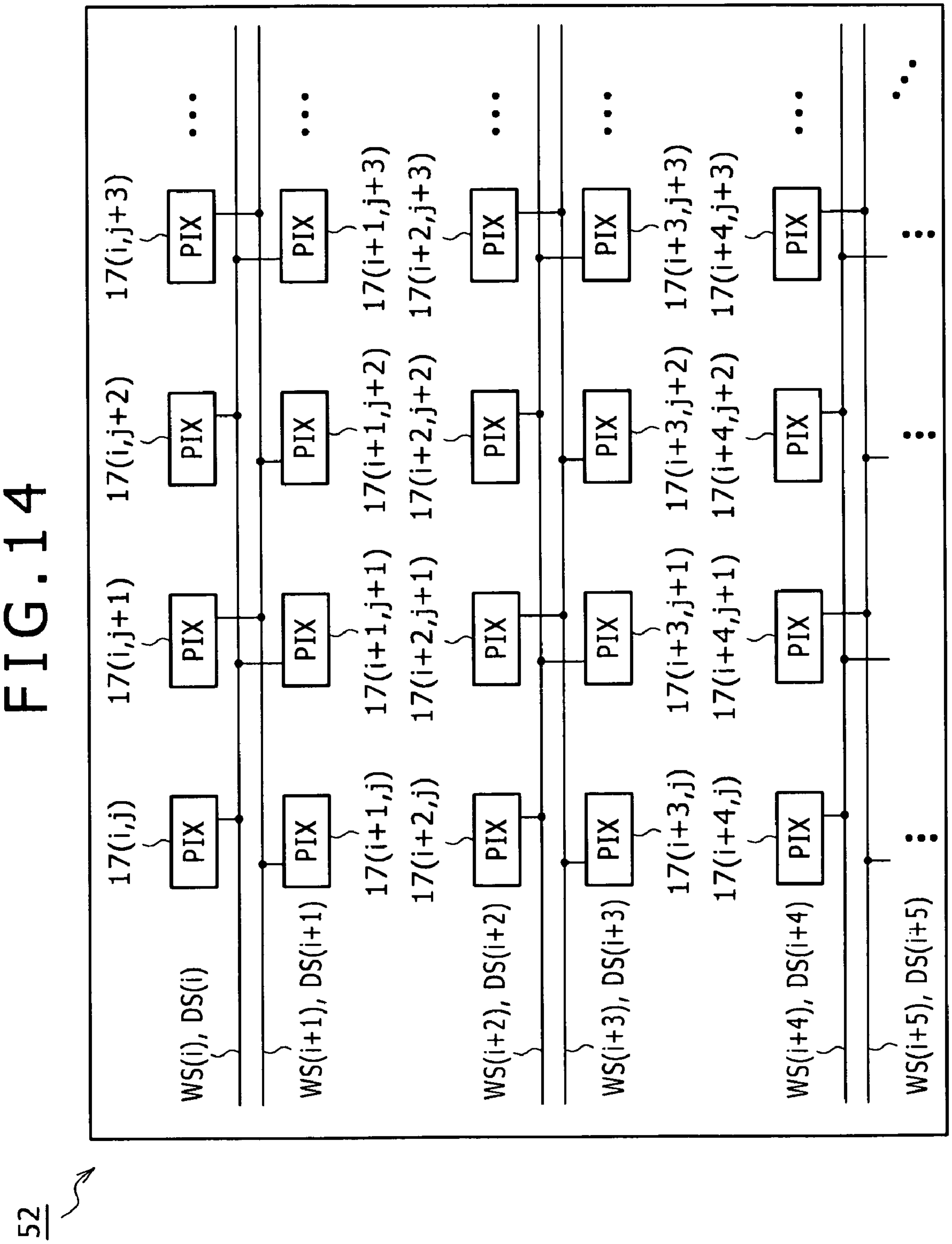
FIG. 14 is a block diagram showing the top view of a further image displaying section created to include a pixel matrix obtained as a result of sequentially arranging monochromatic pixel circuits in place of red-color pixel circuits, green-color pixel circuits and blue-color pixel circuits in the image displaying section shown in the block diagram of FIG. 11 or 13 in a way different from the image displaying sections shown in the block diagrams of FIGS. 11 and 13.

Instead of connecting the two scan lines conveying the driving signals WS and DS respectively to color pixel circuits 17R, 17G and 17B as shown in the block diagram of FIG. 11, the two scan lines conveying the driving signals WS and DS respectively can be connected to color pixel circuits 17R, 17G and 17B as shown in a diagram of FIG. 13. In the case of a monochromatic image displaying apparatus, instead of connecting the two scan lines conveying the driving signals WS and DS respectively to monochromatic pixel circuits 17 as shown in the block diagram of FIG. 3 for the image displaying apparatus 21 according to the first embodiment, the two scan lines conveying the driving signals WS and DS respectively can be connected to monochromatic pixel circuits 17 as shown in a diagram of FIG. 14 for the image displaying apparatus according to the sixth embodiment.

In the case of the image displaying apparatus according to the sixth embodiment, as described above, pixel circuits 17 on a plurality of pixel-matrix rows (k) included in the image displaying section 32 as pixel-matrix rows (k) subjected to the threshold-voltage variation compensation process carried out at the same time are connected to scan lines so that each of two scan lines conveying the driving signals WS (k) and DS (k) respectively on any pixel-matrix row (k) is connected to different pixel circuits 17 arranged in the scan-line direction on the pixel-matrix row (k) where k=i, i+1, i+2 and so on. Thus, the order of timings measured from the timing to carry out the threshold-voltage variation compensation process as the timings to carry out the gradation-voltage setting operations on any specific pixel-matrix row (k) is an order set in the direction of the scan lines and to be swapped with the order of timings measured from the timing to carry out the threshold-voltage variation compensation process as the timings to carry out the gradation-voltage setting operations on an adjacent pixel-matrix row (k+1). As a result, by carrying out the threshold-voltage variation compensation process of compensating the pixel circuit for variations of the threshold voltage Vth of the driving transistor TR1 in the pixel circuit for the pixel-matrix rows (k) at the same time, it is possible to prevent horizontal-direction cords from being generated on the screen of the image displaying apparatus in order to effectively eliminate deteriorations of the quality of an image being displayed on the screen.

Seventh Embodiment

FIGS. 15A1 to 15E2 are explanatory diagrams referred to in description of operations carried out by an image displaying apparatus according to a seventh embodiment as FIGS. 12A1 to 12E2 are explanatory diagrams referred to in description of operations carried out by the image displaying apparatus according to the sixth embodiment. The image displaying apparatus according to the seventh embodiment carries out both the processing to interchange orders each set in the scan-line direction as the order of the timings to carry out the gradation-voltage setting operation in accordance with the sixth embodiment and the processing to interchange orders each set in the time-axis direction as the order of the timings to carry out the gradation-voltage setting operation in accordance with the first embodiment. It is to be noted that the method for interchanging orders each set in the time-axis direction as the order of the timings to carry out the gradation-voltage setting operation in accordance with the first embodiment can be replaced by any one of the order interchanging methods according to the second to fifth embodiments.

Also in the case of the image displaying apparatus according to the seventh embodiment, instead of connecting the two scan lines conveying the driving signals WS and DS respectively to color pixel circuits 17R, 17G and 17B as shown in the block diagram of FIG. 11, the two scan lines conveying the driving signals WS and DS respectively can be connected to color pixel circuits 17R, 17G and 17B as shown in a diagram of FIG. 13. For a monochromatic image displaying apparatus, instead of connecting the two scan lines conveying the driving signals WS and DS respectively to monochromatic pixel circuits 17 as shown in the block diagram of FIG. 3, the two scan lines conveying the driving signals WS and DS respectively can be connected to monochromatic pixel circuits 17 as shown in a diagram of FIG. 14.

Figure 15:
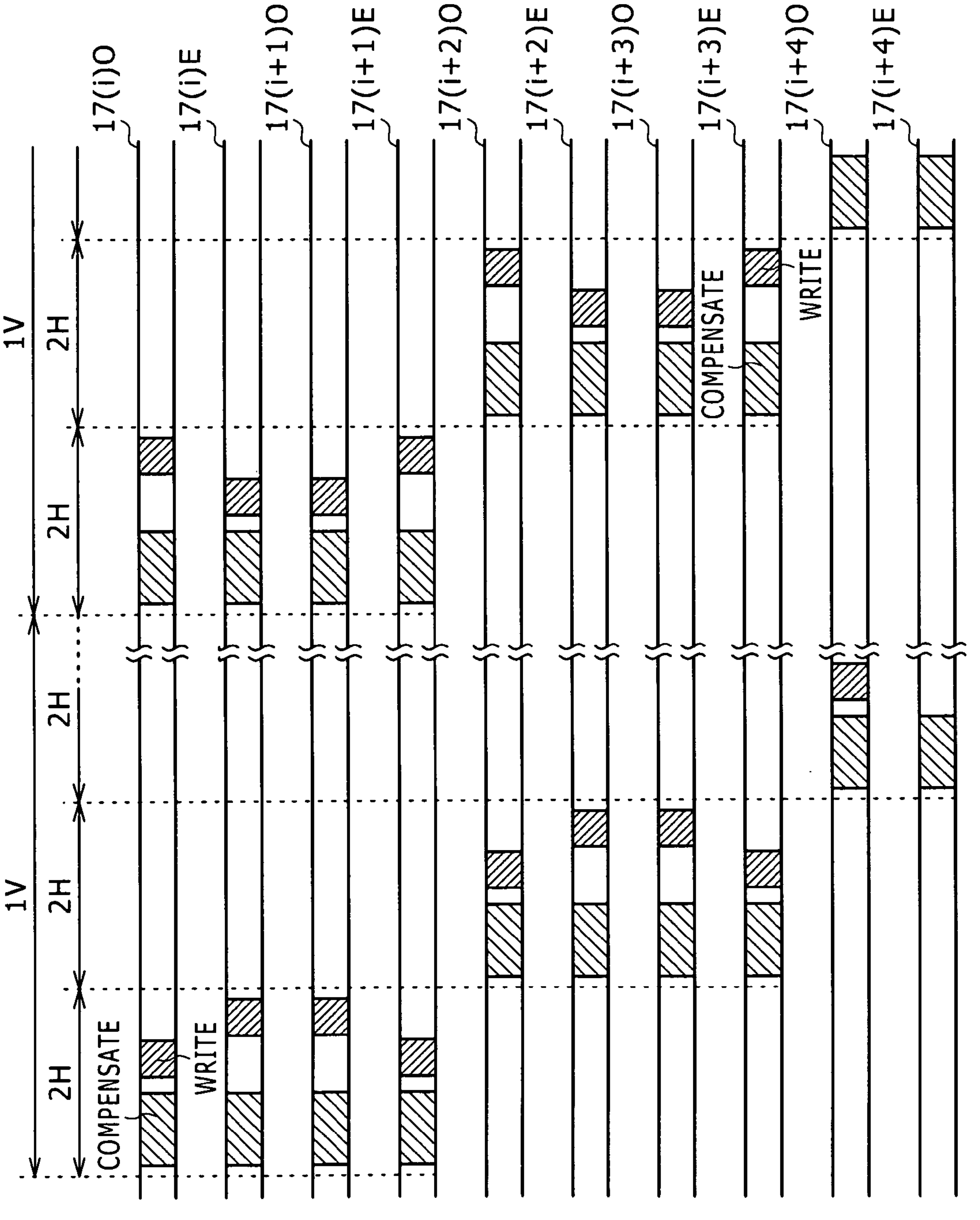

In the explanatory diagrams of FIGS. 15A1 to 15E2, reference notation 17(*i*)O denotes odd-numbered color-pixel sets shown in a sub-diagram of FIG. 15A1 as odd-numbered color-pixel sets on the ith pixel-matrix row whereas reference notation 17(*i*)E denotes even-numbered color-pixel sets shown in a sub-diagram of FIG. 15A2 as even-numbered color-pixel sets on the ith pixel-matrix row. By the same token, reference notation 17(*i*+1)O denotes odd-numbered color-pixel sets shown in a sub-diagram of FIG. 15B1 as odd-numbered color-pixel sets on the (i+1)th pixel-matrix row whereas reference notation 17(*i*+1)E denotes even-numbered color-pixel sets shown in a sub-diagram of FIG. 15B2 as even-numbered color-pixel sets on the (i+1)th pixel-matrix row. In the same way, reference notation 17(*i*+2)O denotes odd-numbered color-pixel sets shown in a sub-diagram of FIG. 15C1 as odd-numbered color-pixel sets on the (i+2)th pixel-matrix row whereas reference notation 17(i+2)E denotes even-numbered color-pixel sets shown in a sub-diagram of FIG. 15C2 as even-numbered color-pixel sets on the (i+2)th pixel-matrix row.

Thus, on the ith pixel-matrix row, the gradation-voltage setting operation is carried out in an alternating order of odd-numbered, even-numbered, odd-numbered, . . . color-pixel sets in a specific field and, then, in an alternating order of even-numbered, odd-numbered, even-numbered, . . . color-pixel sets in a field immediately lagging behind the specified field. On the (i+1)th pixel-matrix row, on the other hand, the gradation-voltage setting operation is carried out in a reversed alternating order of even-numbered, odd-numbered, even-numbered, . . . color-pixel sets in a specific field and, then, in a reserved alternating order of odd-numbered, even-numbered, odd-numbered, . . . color-pixel sets in a field immediately lagging behind the specified field. On the (i+2)th pixel-matrix row, the gradation-voltage setting operation is carried out back in the same alternating order of odd-numbered, even-numbered, odd-numbered, . . . color-pixel sets as the ith pixel-matrix row in a specific field and, then, in the same alternating order of even-numbered, odd-numbered, even-numbered, . . . color-pixel sets as the ith pixel-matrix row in a field immediately lagging behind the specified field.

Thus, the image displaying apparatus according to the seventh embodiment carries out both the processing to interchange orders each set in the scan-line direction as the order of the timings to carry out the gradation-voltage setting operation and the processing to interchange orders each set in the time-axis direction as the order of the timings to carry out the gradation-voltage setting operation. As a result, with a higher degree of reliability, horizontal-direction cords are prevented from being generated on the screen of the image displaying apparatus in order to effectively eliminate deteriorations of the quality of an image being displayed on the screen.

As described above, the image displaying apparatus according to the seventh embodiment carries out both the processing to interchange orders each set in the scan-line direction as the order of the timings to carry out the gradation-voltage setting operation and the processing to interchange orders each set in the time-axis direction as the order of the timings to carry out the gradation-voltage setting operation. As a result, with a higher degree of reliability, it is possible to prevent horizontal-direction cords from being generated on the screen of the image displaying apparatus in order to effectively eliminate deteriorations of the quality of an image being displayed on the screen.

Other Embodiments

In the case of the image displaying apparatus according to each of the first to seventh embodiments described above, the threshold-voltage variation compensation process is carried out on two or three pixel-matrix rows at the same time. However, implementations of the present invention are by no means limited to the first to seventh embodiments. For example, the threshold-voltage variation compensation process can be carried out on four or more pixel-matrix rows at the same time.

Figure 16:
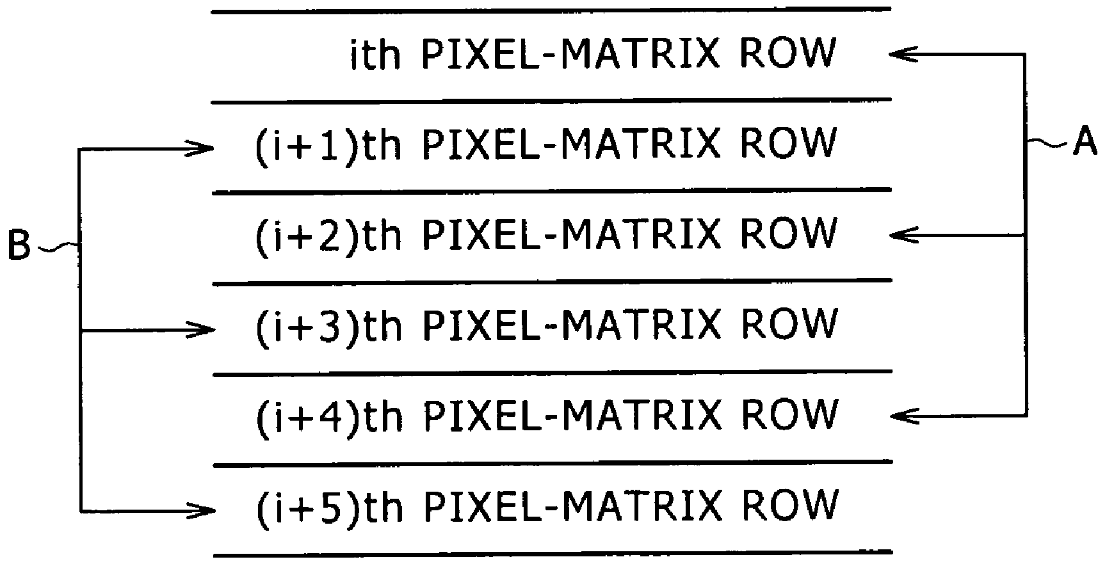
FIG. 16 is an explanatory diagram to be referred to in description of the threshold-voltage variation compensation process carried out on every other pixel-matrix row among a plurality of pixel-matrix rows, which are arranged successively, at the same time.

In addition, in the case of the image displaying apparatus according to each of the first to seventh embodiments described above, the threshold-voltage variation compensation process is carried out on a plurality of pixel-matrix rows, which are arranged successively, at the same time. However, implementations of the present invention are by no means limited to the first to seventh embodiments. For example, the threshold-voltage variation compensation process can be carried out on every other pixel-matrix row among a plurality of pixel-matrix rows, which are arranged successively, at the same time. To put it concretely, after the threshold-voltage variation compensation process has been carried out on a plurality of odd-numbered pixel-matrix rows at the same time as shown by an arrow A in a diagram of FIG. 16 given for an eighth embodiment of the present invention, the threshold-voltage variation compensation process is carried out on a plurality of even-numbered pixel-matrix rows at the same time as shown by an arrow B in the same diagram. That is to say, the threshold-voltage variation compensation process is carried out on a plurality of pixel-matrix rows, which form a process unit, at the same time and the process unit can be changed in a variety of ways in accordance with requirements.

In addition, in the case of the image displaying apparatus according to the each of the sixth and seventh embodiments described above, orders set in the scan-line direction as the orders of timings to carry out the gradation-voltage setting operation are interchanged with each other in operation units which can each be a pixel circuit or a color-pixel set including red-color, green-color and blue-color pixel circuits arranged in the scan-line direction. However, implementations of the present invention are by no means limited to the sixth and seventh embodiments. For example, orders set in the scan-line direction as the orders of timings to carry out the gradation-voltage setting operation are interchanged with each other in operation units each including a plurality of pixel circuits or color-pixel sets, the number of which can be changed in a variety of ways in accordance with requirements. Also in this case, it is possible to give the same effects as the first to seventh embodiments described above.

On top of that, in the case of the image displaying apparatus according to the each of the first to seventh embodiments described above, each pixel circuit is configured to have two transistors, i.e., a driving transistor TR1 and a signal writing transistor TR5, a signal-level holding capacitor C1 and an organic EL device 8. However, implementations of the present invention are by no means limited to the first to seventh embodiments. For example, the configuration of every pixel circuit can be changed in a variety of ways in accordance with the design requirements of the image displaying apparatus which can be used in a wide range of applications as an image displaying apparatus based on the technologies described in the paragraph with a title of "Description of the Related Art."

Figure 17:
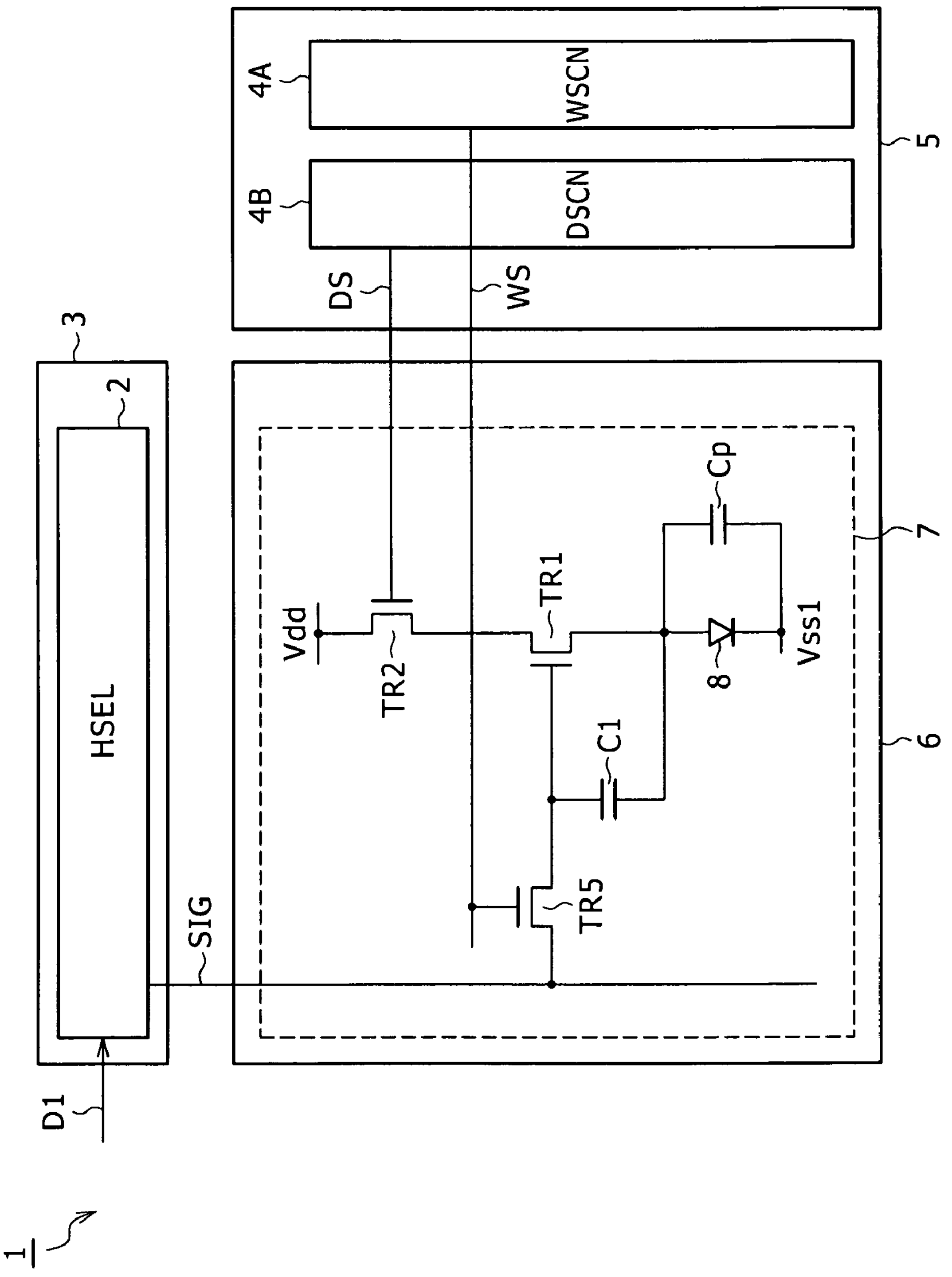
FIG. 17 is a block diagram showing interconnections of sections employed in a related image displaying apparatus.
Figure 18:
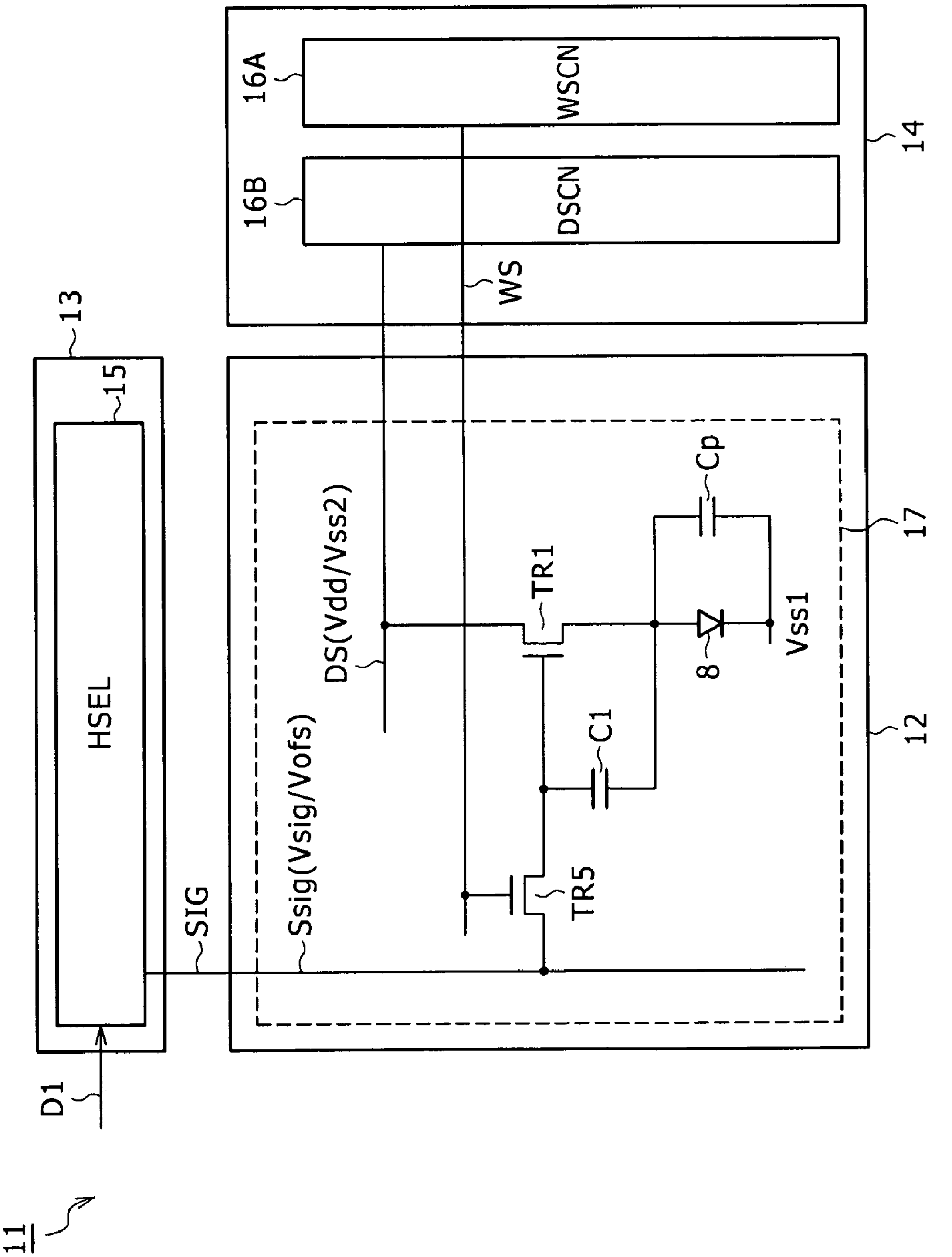
FIG. 18 is a block diagram showing simplified interconnections of sections employed in another related image displaying apparatus 11.
Figure 19C:
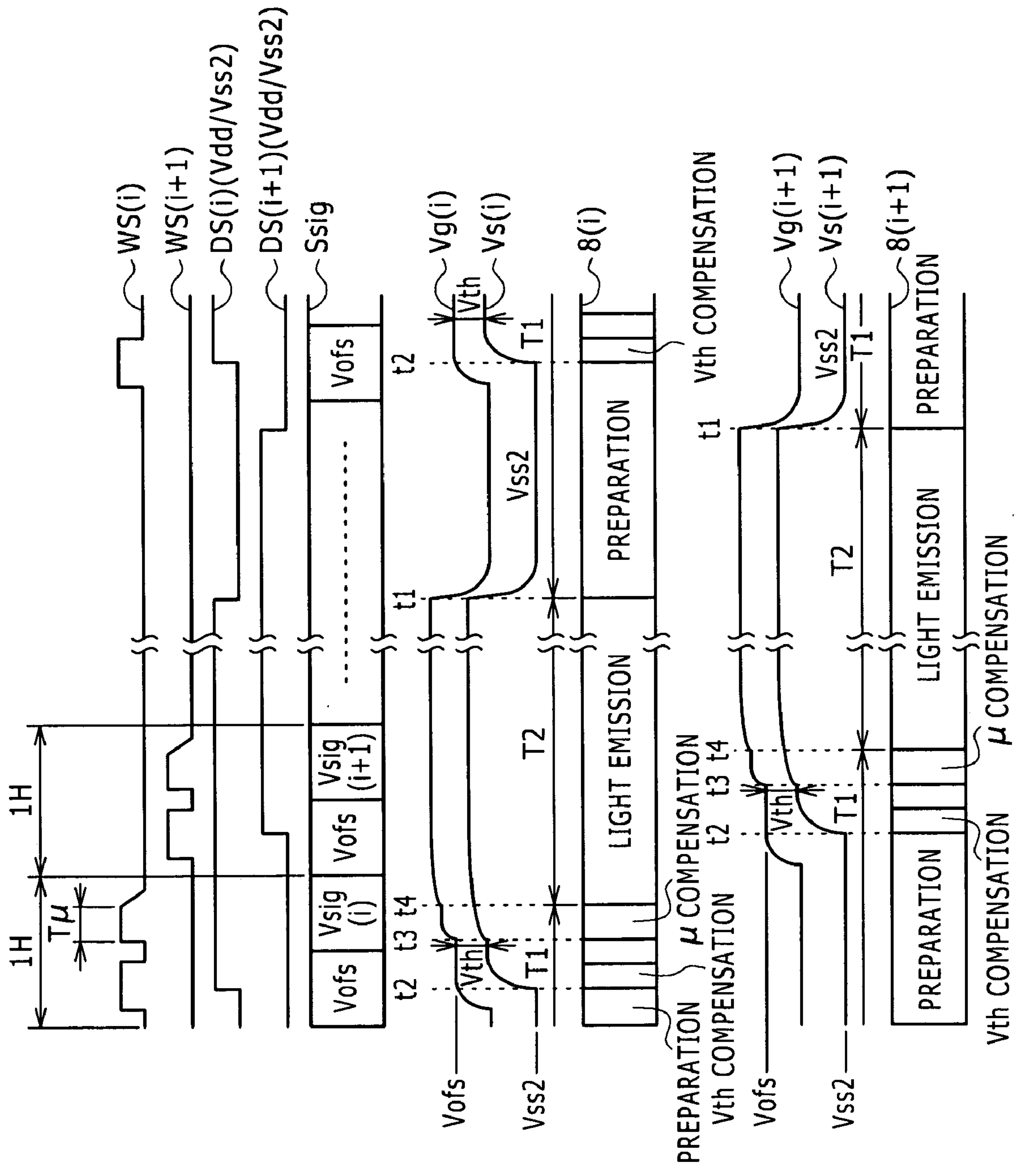
Figures 20A, 20B, 20C, 20D, 20E:
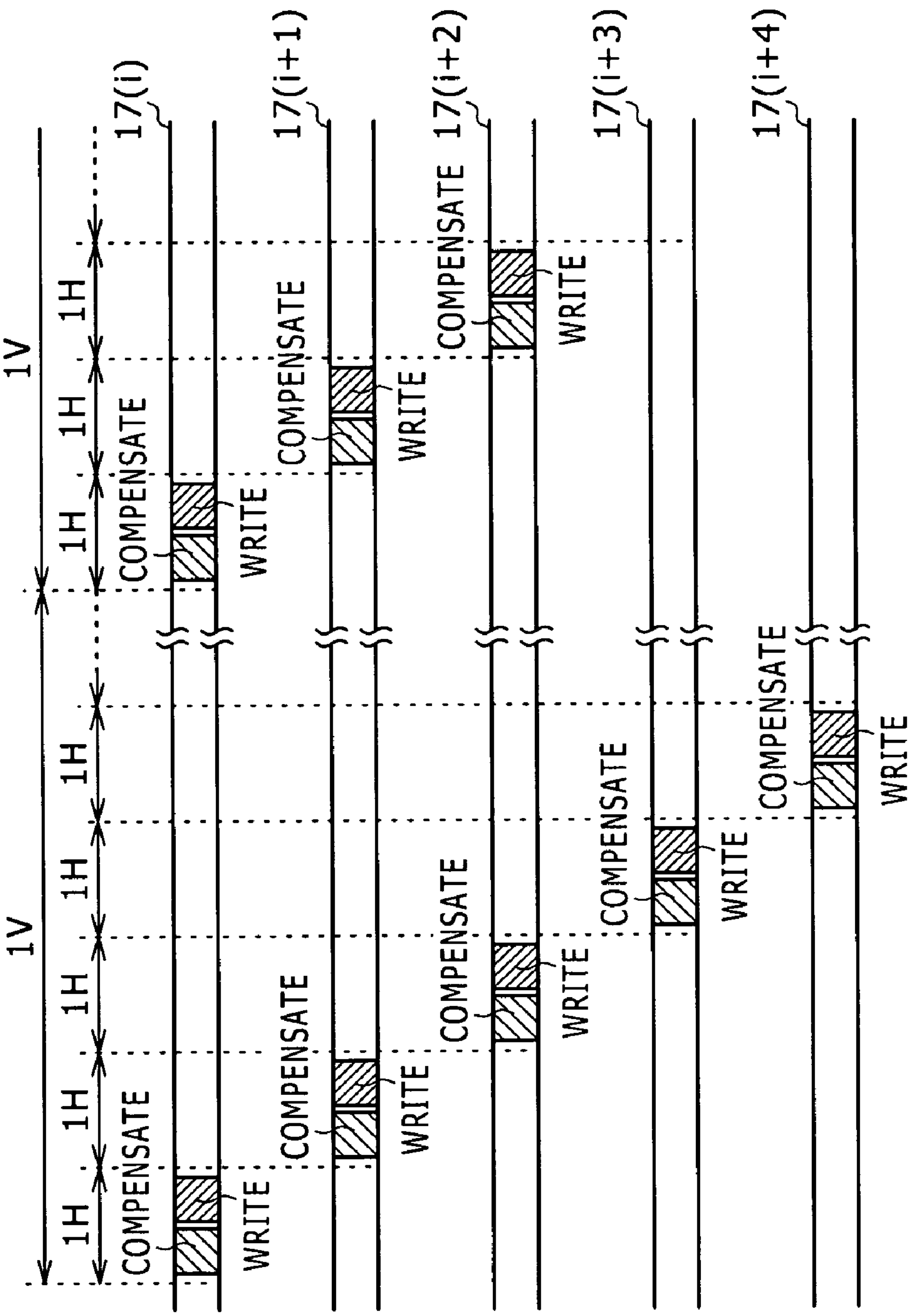
FIGS. 20A to 20E are explanatory diagrams showing timings to carry out a threshold-voltage variation compensation process and a gradation-voltage setting operation on a plurality of pixel-matrix rows in the image displaying apparatus shown in the block diagram of FIG. 18.
Figures 21A, 21B, 21C, 21D, 21E:
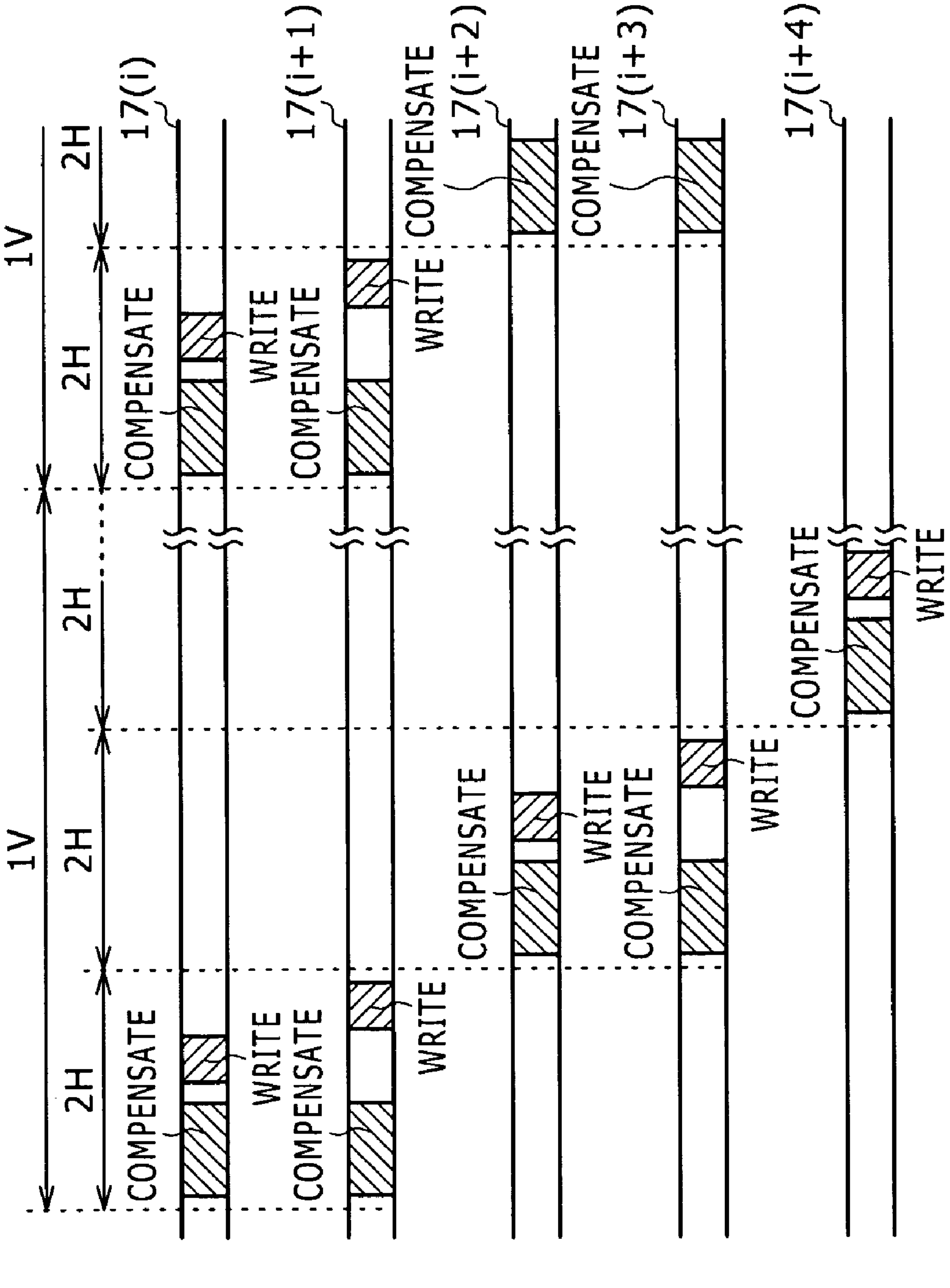
FIGS. 21A to 21E are explanatory diagrams showing timings to carry out a threshold-voltage variation compensation process and a gradation-voltage setting operation on a plurality of pixel-matrix rows in an image displaying apparatus designed to solve problems raised by the image displaying apparatus shown in the block diagram of FIG. 18.
Figure 22C:
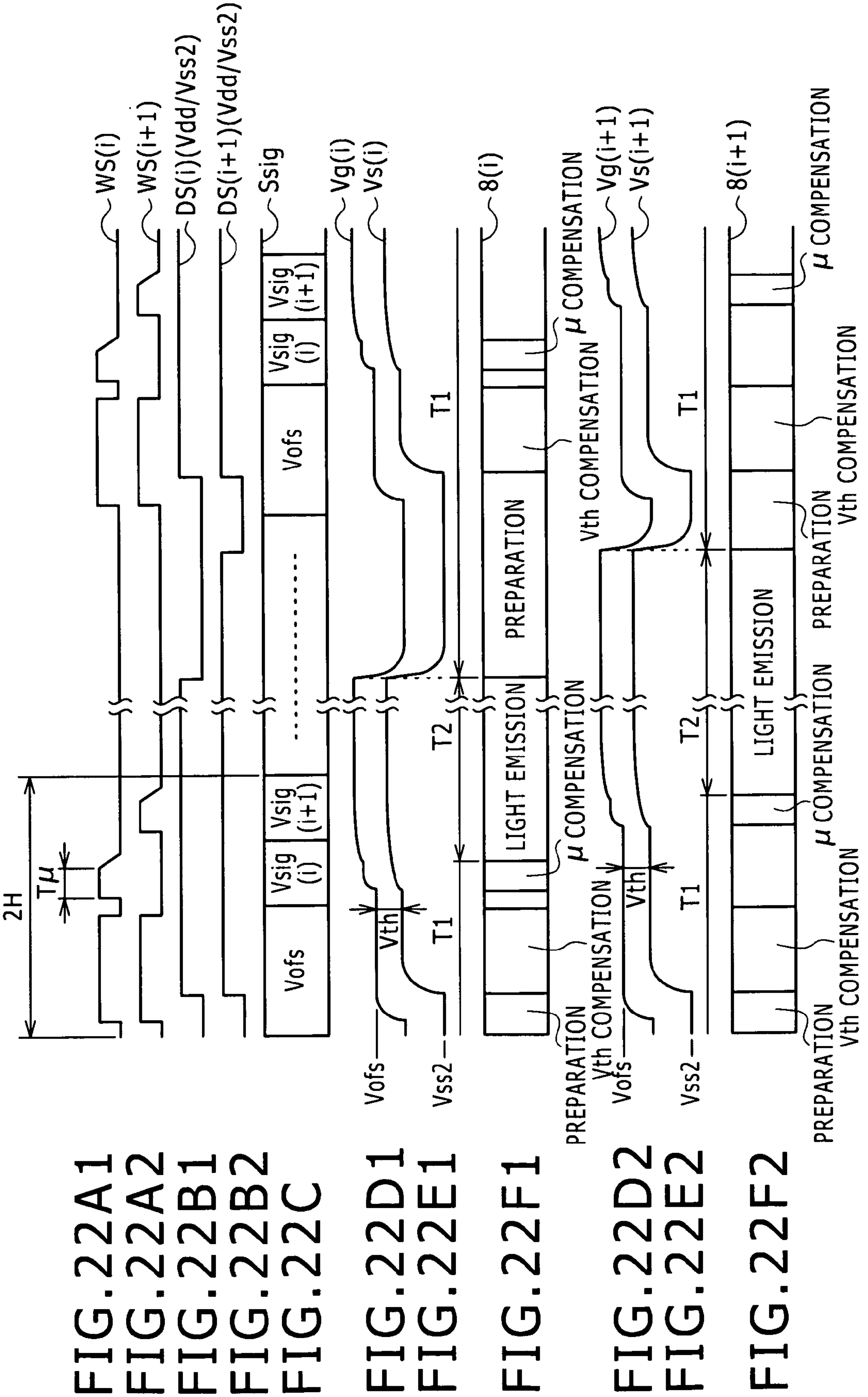

To put it concretely, in the case of the image displaying apparatus according to the each of the first to seventh embodiments described above, the drive scan-line driving signal DS asserted on a drive scan line is supplied to a terminal connected to the anode electrode of the organic EL device 8 to serve as the other terminal of the signal-level holding capacitor C1 through the driving transistor TR1 as shown in the block diagram of FIG. 18. However, implementations of the present invention are by no means limited to the first to seventh embodiments. For example, in a wide range of applications, the drive scan-line driving signal DS asserted on the drive scan line can be supplied to gate electrode of the power switching transistor TR2 which applies the power-supply voltage Vdd to the terminal connected to the anode electrode of the organic EL device 8 to serve as the other terminal of the signal-level holding capacitor C1 through the driving transistor TR1 as shown in the block diagram of FIG. 17. That is to say, in the case of the pixel circuit 7 shown in the block diagram of FIG. 17, it is necessary to additionally provide a dedicated power supply for generating the power-supply voltage Vdd and the power switching transistor TR2.

In addition, in the case of the image displaying apparatus according to the each of the first to seventh embodiments described above, the voltage appearing on a terminal connected to the gate electrode of the signal-level holding capacitor C1 on a side opposite to the organic EL device 8 with respect to the signal-level holding capacitor C1 to serve as the specific terminal of the signal-level holding capacitor C1 is set at the level of a predetermined reference voltage Vofs appearing on the signal line SIG as a signal-line driving signal Ssig in the compensation preparing process. However, implementations of the present invention are by no means limited to the first to seventh embodiments. For example, in a wide range of applications, the voltage appearing on the terminal connected to the gate electrode of the signal-level holding capacitor C1 to serve as the specific terminal of the signal-level holding capacitor C1 is set at the level of the predetermined reference voltage Vofs which is specially generated by making use of a dedicated power supply and a switching transistor for electrically connecting the dedicated power supply to the gate electrode of the driving transistor TR1 and electrically disconnecting the dedicated power supply from the gate electrode.

On top of that, in the case of the image displaying apparatus according to the each of the first to seventh embodiments described above, the lengths of the light emission and the no-light emission periods of the organic EL device 8 are adjusted by controlling an operation to select the power-supply voltage Vdd or the other reference voltage Vss2 to serve as a voltage supplied to the organic EL device 8 by way of the driving transistor TR1. However, implementations of the present invention are by no means limited to the first to seventh embodiments. For example, in a wide range of applications, the power switching transistor TR2 is used for controlling an operation to supply the power-supply voltage Vdd to the organic EL device 8 by way of the driving transistor TR1 as described earlier by referring to the block diagram of FIG. 17.

It is to be noted that, in the case of an image displaying apparatus having a high image displaying resolution, the period of 1H becomes short and is therefore not long enough for carrying out the threshold-voltage variation compensation process and the gradation-voltage setting operation by properly changing the electric potential of the signal-line driving signal Ssig appearing on the signal line SIG in a variety of configurations of the pixel circuits of the embodiments described above. As explained before, the threshold-voltage variation compensation process is a process for compensating a pixel circuit for variations of the threshold voltage Vth of the driving transistor TR1 in the pixel circuit from transistor to transistor whereas the gradation-voltage setting operation including the mobility variation compensation process is an operation to apply the gradation voltage Vsig appearing on the signal line SIG to the gate electrode of the driving transistor TR1. Also as explained before, the mobility variation compensation process is a process for compensating a pixel circuit for variations of the mobility μ of the driving transistor TR1 in the pixel circuit from transistor to transistor.

In order to solve the problem caused by the period of 1H becoming too short, a period of 2H having the length twice the length of the period of 1H is taken as a period sufficiently long to be allocated to one threshold-voltage variation compensation process and, typically, two gradation-voltage setting operations. This is because the threshold-voltage variation compensation process is carried out only once during the period of 2H on two pixel-matrix rows. Then, the threshold-voltage variation compensation process is carried out on two pixel-matrix rows at the same time whereas the two gradation-voltage setting operations are carried out on the two pixel-matrix rows sequentially on a row-after-row basis, that is, one gradation-voltage setting operation carried out at one time on one pixel-matrix row. Nevertheless, subtle differences in emitted-light luminance between the pixel-matrix rows on which the threshold-voltage variation compensation process is carried out at the same time are made eye-catching with ease by this solution to the problem.

In accordance with an embodiment of the present invention, however, the order of the timings to carry out the gradation-voltage setting operation on one of the two pixel-matrix rows is swapped with the order of the timings to carry out the gradation-voltage setting operation on the other pixel-matrix row. In this way, even if there are subtle differences in emitted-light luminance between a plurality of pixel-matrix rows on which the threshold-voltage variation compensation process is carried out at the same time, it is possible to diminish the appearance of the subtle differences with a high degree of reliability.

In addition, in the case of the image displaying apparatus according to the each of the first to seventh embodiments described above, the organic EL device 8 is employed in the pixel circuit to serve as the light emitting device. However, implementations of the present invention are by no means limited to the first to seventh embodiments. For example, in a wide range of applications, a current-driven light emitting device of another kind is employed in the pixel circuit.

In general, the present invention relates to an image displaying apparatus as well as an image displaying method adopted by the image displaying apparatus, and can be applied typically to a display apparatus adopting an active matrix driving technique provided for organic EL (Electro Luminescence) devices employed in the image displaying apparatus.

The present application contains subject matter related to that disclosed in Japanese Priority Patent Application JP 2008-080097 filed in the Japan Patent Office on Mar. 26, 2008, the entire content of which is hereby incorporated by reference.

It should be understood by those skilled in the art that a variety of modifications, combinations, sub-combinations and alterations may occur, depending on design requirements and other factors insofar as they are within the scope of the appended claims or the equivalents thereof.

What is claimed is:

1. An image displaying apparatus for displaying a desired image on an image displaying section employed in said image displaying apparatus by making use of a signal-line driving circuit and a scan-line driving circuit to drive pixel circuits laid out on said image displaying section to form a pixel matrix, wherein:

each of said pixel circuits includes at least a light emitting device, a signal-level holding capacitor, a driving transistor for driving said light emitting device and a signal writing transistor which can be put in a state of being turned on by a write signal output by said scan-line driving circuit;

said signal-line driving circuit and said scan-line driving circuit drive each of said pixel circuits so as to put said light emitting device employed in said pixel circuit in a no-light emission state of emitting no light in a no-light emission period and a light emission state of emitting light in a light emission period repeatedly in an alternating manner;

in said no-light emission period, after execution of a threshold-voltage variation compensation process of compensating said pixel circuit for variations of the threshold voltage of said driving transistor in said pixel circuit from transistor to transistor by setting a voltage appearing between the two terminals of said signal-level holding capacitor at a voltage dependent on said threshold voltage of said driving transistor, a gradation-voltage setting operation is carried out by putting said signal writing transistor in a state of being turned on, correcting a gradation voltage representing the luminance of light emitted by said light emitting device by making use of said voltage set in advance between said two terminals of said signal-level holding capacitor as said voltage dependent on said threshold voltage of said driving transistor and newly setting said corrected gradation voltage between the gate and source electrodes of said driving transistor;

in said light emission period, said driving transistor drives said light emitting device to emit light at a luminance representing a gradation corresponding to said corrected gradation voltage set between said two terminals of said signal-level holding capacitor;

in said no-light emission period, said signal-line driving circuit and said scan-line driving circuit drive said pixel circuits on a plurality of any specific pixel-matrix rows in said image displaying section in order to carry out said threshold-voltage variation compensation process at the same time and, then, drive said pixel circuits on said specific pixel-matrix rows sequentially on a row-after-row basis in order to carry out said gradation-voltage setting operation on one of said specific pixel-matrix rows at one time for every one of said specific pixel-matrix rows; and in said no-light emission period, said signal-line driving circuit and said scan-line driving circuit drive said pixel circuits on said specific pixel-matrix rows in said image displaying section also in order to interchange a timing to carry out said gradation-voltage setting operation on one of said specific pixel-matrix rows as an operation lagging behind said threshold-voltage variation compensation process, which has been carried out on all said specific pixel-matrix rows at the same time, with a timing to carry out said gradation-voltage setting operation on another one of said specific pixel-matrix rows as an operation lagging behind said threshold-voltage variation compensation process in a time-axis direction and/or a scan-line direction.

2. The image displaying apparatus according to claim 1, wherein:

during said threshold-voltage variation compensation process lagging behind a compensation preparing process of setting said voltage appearing between said two terminals of said signal-level holding capacitor at a voltage at least equal to said threshold voltage of said driving transistor, said pixel circuit discharges said voltage appearing between said two terminals of said signal-level holding capacitor through said driving transistor in order to set said voltage appearing between said two terminals of said signal-level holding capacitor at a voltage equal to said threshold voltage of said driving transistor, whereas during said compensation preparing process;

said signal writing transistor is driven to electrically connect the gate electrode of said driving transistor to a signal line driven by said signal-line driving circuit in order to set said gate electrode connected a specific terminal of said driving transistor at a predetermined voltage asserted on said signal line; and a voltage appearing on the drain electrode of said driving transistor is lowered in order to pull down a voltage appearing on an electrode, which is connected to another terminal of said signal-level holding capacitor to serve as an anode electrode of said light emitting device, so as to set said voltage appearing between said two terminals of said signal-level holding capacitor at a voltage at least equal to said threshold voltage of said driving transistor.

3. The image displaying apparatus according to claim 1, wherein said specific pixel-matrix rows are pixel-matrix rows adjacent to each other.

4. The image displaying apparatus according to claim 1, wherein said image displaying section interchanges ends of said light emission periods with each other in a manner of being interlocked with processing to interchange timings to carry out said gradation-voltage setting operation with each other in order to make the lengths of said light emission periods of said pixel circuits on said specific pixel-matrix rows equal to each other.

5. The image displaying apparatus according to claim 1, wherein:

said specific pixel-matrix rows are two pixel-matrix rows adjacent to each other; and in a transition from any particular field to a field immediately lagging behind said particular field, said image displaying section interchanges a timing to carry out said gradation-voltage setting operation on said pixel circuits of any specific one of said two adjacent pixel-matrix rows with a timing to carry out said gradation-voltage setting operation on said pixel circuits of the other one of said two adjacent pixel-matrix rows so that the order of executing said threshold-voltage variation compensation process and said gradation-voltage setting operation lagging behind said threshold-voltage variation compensation process on said pixel circuits of said specific adjacent pixel-matrix row is interchanged in a time-axis direction with the order of executing said threshold-voltage variation compensation process and said gradation-voltage setting operation lagging behind said threshold-voltage variation compensation process on said pixel circuits of said other adjacent pixel-matrix row.

6. The image displaying apparatus according to claim 1, wherein:

said specific pixel-matrix rows are at least three pixel-matrix rows adjacent to each other; and in a transition from any particular field to a field immediately lagging behind said particular field, said image displaying section interchanges timings to carry out said gradation-voltage setting operation on said pixel circuits of said three adjacent pixel-matrix rows with each other sequentially by rotating said timings over said three adjacent pixel-matrix rows so that the order of executing said threshold-voltage variation compensation process and said gradation-voltage setting operation lagging behind said threshold-voltage variation compensation process on said pixel circuits of said three adjacent pixel-matrix rows is changed in a time-axis direction.

7. The image displaying apparatus according to claim 1, wherein:

said specific pixel-matrix rows are at least three pixel-matrix rows adjacent to each other; and in a transition from any particular field to a field immediately lagging behind said particular field, said image displaying section reverses a sequence set throughout said three adjacent pixel-matrix rows to serve as the sequence of executing pairs each including said threshold-voltage variation compensation process and said gradation-voltage setting operation lagging behind said threshold-voltage variation compensation process on said pixel circuits of said three adjacent pixel-matrix rows so that timings to carry out said gradation-voltage setting operation on said pixel circuits of said three adjacent pixel-matrix rows are interchanged with each other in a time-axis direction.

8. The image displaying apparatus according to claim 1, wherein:

said specific pixel-matrix rows are pixel-matrix rows adjacent to each other; and in a transition from any particular field to a field immediately lagging behind said particular field, said image displaying section interchanges a timing to carry out said gradation-voltage setting operation on said pixel circuits of any specific one of said adjacent pixel-matrix rows with a timing to carry out said gradation-voltage setting operation on said pixel circuits of another one of said adjacent pixel-matrix rows so that the order of executing said threshold-voltage variation compensation process and said gradation-voltage setting operation lagging behind said threshold-voltage variation compensation process on said pixel circuits of said specific adjacent pixel-matrix row is interchanged in a time-axis direction with the order of executing said threshold-voltage variation compensation process and said gradation-voltage setting operation lagging behind said threshold-voltage variation compensation process on said pixel circuits of said other adjacent pixel-matrix row.

9. The image displaying apparatus according to claim 1, wherein said pixel circuits on any particular one of said specific pixel-matrix rows are connected to a scan line provided for said particular specific pixel-matrix row differently from a way in which said pixel circuits on said specific pixel-matrix row adjacent to said particular specific pixel-matrix row are connected to a scan line provided for said adjacent specific pixel-matrix row so that a timing lagging behind said threshold-voltage variation compensation process to serve as a timing to carry out said gradation-voltage setting operation on said pixel circuits on said particular specific pixel-matrix row is interchanged in a scan-line direction with a timing lagging behind said threshold-voltage variation compensation process to serve as a timing to carry out said gradation-voltage setting operation on said pixel circuits on said adjacent specific pixel-matrix row.

10. An image displaying method to be adopted in an image displaying apparatus for displaying a desired image on an image displaying section employed in said image displaying apparatus by making use of a signal-line driving circuit and a scan-line driving circuit to drive pixel circuits laid out on said image displaying section to form a pixel matrix to serve as pixel circuits each employing at least a light emitting device, a signal-level holding capacitor, a driving transistor for driving said light emitting device and a signal writing transistor which can be put in a state of being turned on by a write signal output by said scan-line driving circuit, said image displaying method comprising the steps of:

carrying out to control said signal-line driving circuit and said scan-line driving circuit so as to execute a no-light emission step of driving each of said pixel circuits in order to put said light emitting device employed in said pixel circuit into a no-light emission state of emitting no light in a no-light emission period and a light emission step of driving said pixel circuit in order to put said light emitting device employed in said pixel circuit in a light emission state of emitting light in a light emission period repeatedly in an alternating manner;

at said no-light emission step, after execution of a threshold-voltage variation compensation process of compensating said pixel circuit for variations of the threshold voltage of said driving transistor in said pixel circuit from transistor to transistor by setting a voltage appearing between the two terminals of said signal-level holding capacitor at a voltage dependent on said threshold voltage of said driving transistor, carrying out a gradation-voltage setting operation by putting said signal writing transistor in a state of being turned on, correcting a gradation voltage representing said luminance of light emitted by said light emitting device by making use of said voltage set in advance between said two terminals of said signal-level holding capacitor as said voltage dependent on said threshold voltage of said driving transistor and newly setting said corrected gradation voltage between the gate and source electrodes of said driving transistor;

at said light emission step, by said driving transistor, driving said light emitting device to emit light at a luminance representing a gradation corresponding to said corrected gradation voltage set between said two terminals of said signal-level holding capacitor;

at said no-light emission step, by said signal-line driving circuit and said scan-line driving circuit, driving said pixel circuits on a plurality of any specific pixel-matrix rows in said image displaying section in order to carry out said threshold-voltage variation compensation process at the same time, and driving said pixel circuits on said specific pixel-matrix rows sequentially on a row-after-row basis in order to carry out said gradation-voltage setting operation on one of said specific pixel-matrix rows at one time for every one of said specific pixel-matrix rows; and at said no-light emission step, by said signal-line driving circuit and said scan-line driving circuit, driving said pixel circuits on said specific pixel-matrix rows in said image displaying section also in order to interchange a timing to carry out said gradation-voltage setting operation on one of said specific pixel-matrix rows as an operation lagging behind said threshold-voltage variation compensation process, which has been carried out on all said specific pixel-matrix rows at the same time, with a timing to carry out said gradation-voltage setting operation on another one of said specific pixel-matrix rows as an operation lagging behind said threshold-voltage variation compensation process in a time-axis direction and/or a scan-line direction.

* * * * *